(12) United States Patent
Catledge

(10) Patent No.: US 12,006,067 B2
(45) Date of Patent: Jun. 11, 2024

(54) LAUNCH ON DEMAND

(71) Applicant: Launch On Demand Corporation, Cocoa Beach, FL (US)

(72) Inventor: Burton H. Catledge, Cocoa Beach, FL (US)

(73) Assignee: Launch on Demand Corporation, Cocoa Beach, FL (US)

( * ) Notice: Subject to any disclaimer, the term of this patent is extended or adjusted under 35 U.S.C. 154(b) by 10 days.

(21) Appl. No.: 16/887,490

(22) Filed: May 29, 2020

(65) Prior Publication Data

US 2020/0377234 A1     Dec. 3, 2020

Related U.S. Application Data

(60) Provisional application No. 62/854,937, filed on May 30, 2019.

(51) Int. Cl.
  *B64G 1/00* (2006.01)
  *G08G 5/00* (2006.01)

(52) U.S. Cl.
  CPC .......... *B64G 1/002* (2013.01); *G08G 5/0026* (2013.01)

(58) Field of Classification Search
  CPC ...... B64G 1/002; B64G 5/00; B64G 1/00208; G08G 5/0026; G08G 5/0073; G08G 5/0013; G08G 5/0065; G08G 5/0082; G08G 5/0091
  See application file for complete search history.

(56) References Cited

U.S. PATENT DOCUMENTS

| | | | | | |
|---|---|---|---|---|---|
| 3,231,219 A | * | 1/1966 | Young | ...................... | B64G 1/58 62/239 |
| 3,397,573 A | * | 8/1968 | Carter | .................... | G01C 13/00 340/870.16 |

(Continued)

FOREIGN PATENT DOCUMENTS

| | | | | |
|---|---|---|---|---|
| CA | 2880781 A1 | * | 2/2014 | ............... B64G 1/56 |
| CN | 1481625 A | * | 3/2004 | ......... H04B 7/18502 |

(Continued)

OTHER PUBLICATIONS

"DoD experiments on commercial spacecraft;" Simonds, J., Mitchell, A.; 2009 IEEE Aerospace conference (pp. 1-9); Mar. 1, 2009. (Year: 2009).*

(Continued)

*Primary Examiner* — Khoi H Tran
*Assistant Examiner* — Jorge O Peche
(74) *Attorney, Agent, or Firm* — The Marbury Law Group, PLLC

(57) ABSTRACT

Systems, methods, devices, and non-transitory media of the various embodiments may enable the identification of launch opportunities. The integrated approach of the various embodiments leverages instrumentation, data and communication systems available from the National Airspace System (NAS), Marine Transportation System (MTS), and orbital catalog to enable safe passage for space vehicles, passengers, and payloads. The condition-based launch criteria of the various embodiments may improve mission assurance and public safety while simultaneously supporting a customer's launch on readiness schedule.

20 Claims, 31 Drawing Sheets

(56) References Cited

U.S. PATENT DOCUMENTS

| | | | |
|---|---|---|---|
| 4,114,841 A * | 9/1978 | Muhlfelder | B64G 1/32 701/500 |
| 4,786,207 A | 11/1988 | Morton et al. | |
| 4,932,607 A | 6/1990 | Layton et al. | |
| 4,939,702 A * | 7/1990 | Murphree | G01V 1/001 367/87 |
| 5,191,162 A * | 3/1993 | Czimmek | B63B 35/003 114/65 R |
| 5,511,748 A * | 4/1996 | Scott | B64G 1/1078 244/172.5 |
| 5,564,653 A * | 10/1996 | Ohayon | B64G 1/52 89/1.801 |
| 5,626,310 A * | 5/1997 | Kelly | B64G 5/00 244/171.4 |
| 5,740,985 A * | 4/1998 | Scott | B64D 5/00 244/159.3 |
| 5,803,407 A * | 9/1998 | Scott | B64G 1/242 244/164 |
| 5,806,802 A * | 9/1998 | Scott | B64G 1/242 701/13 |
| 6,017,000 A * | 1/2000 | Scott | B64G 1/24 244/158.6 |
| 6,102,334 A | 8/2000 | Claffey et al. | |
| 6,364,252 B1 | 4/2002 | Anderman | |
| 6,543,716 B1 * | 4/2003 | Miller | G01S 13/72 244/3.21 |
| 6,549,158 B1 * | 4/2003 | Hanson | G01S 7/285 342/194 |
| 6,561,074 B1 * | 5/2003 | Engel | F41G 7/2246 89/1.818 |
| 6,575,400 B1 * | 6/2003 | Hopkins | G01S 13/72 244/3.19 |
| 6,603,421 B1 * | 8/2003 | Schiff | F42B 15/01 342/149 |
| 6,630,902 B1 * | 10/2003 | Fenton | F41G 7/2206 342/194 |
| 6,859,731 B2 * | 2/2005 | Takafuji | G08G 1/166 342/72 |
| 7,252,270 B2 | 8/2007 | Mitzmacher | |
| 7,264,204 B1 * | 9/2007 | Portmann | B63B 35/50 244/110 F |
| 7,511,252 B1 * | 3/2009 | Pedersen | F41G 7/30 342/61 |
| 8,056,461 B2 | 11/2011 | Bossert et al. | |
| 8,718,920 B2 | 5/2014 | Tanygin | |
| 8,723,686 B1 * | 5/2014 | Murray | G08G 5/0021 701/538 |
| 8,749,431 B2 | 6/2014 | Thill et al. | |
| 9,308,970 B1 * | 4/2016 | Gefken | B63B 21/48 |
| 9,499,284 B1 * | 11/2016 | Voorhees | B64G 1/36 |
| 10,029,806 B2 | 7/2018 | Fuller | |
| 10,254,094 B1 * | 4/2019 | Harrison | F42B 10/46 |
| 10,307,970 B2 * | 6/2019 | Snyder | B29C 64/321 |
| 10,562,599 B1 * | 2/2020 | Toth | B63B 35/44 |
| 10,974,853 B1 * | 4/2021 | Burcar | B64G 1/002 |
| 11,041,692 B1 * | 6/2021 | Chromych | F41F 3/0413 |
| 2002/0097690 A1 * | 7/2002 | Fleeter | H04B 7/216 370/316 |
| 2002/0178258 A1 | 11/2002 | Hushing, III et al. | |
| 2003/0010015 A1 * | 1/2003 | Beck | B64G 1/002 60/204 |
| 2004/0024527 A1 * | 2/2004 | Patera | G08G 5/045 342/29 |
| 2004/0024528 A1 * | 2/2004 | Patera | G08G 5/045 340/961 |
| 2004/0026571 A1 * | 2/2004 | Scott | B64G 1/24 244/172.5 |
| 2005/0258311 A1 * | 11/2005 | Scott | B64G 1/1078 244/172.4 |
| 2006/0032986 A1 * | 2/2006 | Maker | B64G 5/00 244/171.6 |
| 2007/0159379 A1 * | 7/2007 | Bannasch | F41J 2/00 342/67 |
| 2007/0194171 A1 | 8/2007 | Diamandis et al. | |
| 2008/0001027 A1 * | 1/2008 | Watts | B64G 5/00 244/63 |
| 2009/0107386 A1 * | 4/2009 | Sampson | B63B 22/003 343/709 |
| 2010/0096491 A1 * | 4/2010 | Whitelaw | B64G 1/00 725/75 |
| 2010/0193640 A1 * | 8/2010 | Atmur | B64G 1/242 244/158.2 |
| 2010/0250137 A1 | 9/2010 | Hoots | |
| 2011/0073707 A1 | 3/2011 | Bossert et al. | |
| 2011/0222225 A1 * | 9/2011 | Kessler | G08C 19/16 361/679.02 |
| 2012/0032029 A1 * | 2/2012 | Dee La Pena Llaca | B64G 1/002 244/171.3 |
| 2012/0316769 A1 * | 12/2012 | Gagliardi | B63B 35/086 701/300 |
| 2013/0024102 A1 * | 1/2013 | Tanygin | B64G 1/002 701/301 |
| 2013/0054195 A1 * | 2/2013 | Jones | H01J 49/0013 702/187 |
| 2013/0200207 A1 | 8/2013 | Pongratz et al. | |
| 2014/0039733 A1 * | 2/2014 | Ren | G08G 5/0013 701/14 |
| 2014/0166817 A1 | 6/2014 | Levien et al. | |
| 2014/0203961 A1 * | 7/2014 | Kent | G01S 7/295 342/26 D |
| 2015/0209978 A1 * | 7/2015 | Snyder | B33Y 40/00 425/162 |
| 2015/0284109 A1 * | 10/2015 | Newton | G06Q 10/06 701/3 |
| 2015/0339933 A1 | 11/2015 | Batla et al. | |
| 2015/0375875 A1 * | 12/2015 | Dula | B64G 1/402 244/171.3 |
| 2016/0124105 A1 * | 5/2016 | Valsvik | B63G 8/001 367/15 |
| 2016/0209234 A1 * | 7/2016 | Passinger | G08G 5/0047 |
| 2016/0251092 A1 * | 9/2016 | Cappaert | H02J 7/35 307/9.1 |
| 2016/0266249 A1 * | 9/2016 | Kauffman | G01W 1/02 |
| 2016/0275801 A1 * | 9/2016 | Kopardekar | G08G 5/0082 |
| 2016/0306833 A1 * | 10/2016 | Esposito | G01S 7/003 |
| 2016/0311557 A1 * | 10/2016 | Fuller | B64G 1/242 |
| 2017/0057635 A1 * | 3/2017 | Strayer | B64C 39/024 |
| 2017/0129626 A1 * | 5/2017 | Bryan | B64G 1/14 |
| 2017/0190446 A1 * | 7/2017 | Williams, Sr. | B64G 1/401 |
| 2017/0192095 A1 * | 7/2017 | Jobanputra | H04B 7/185 |
| 2017/0233112 A1 * | 8/2017 | McVicker | B64G 1/002 701/3 |
| 2017/0251096 A1 * | 8/2017 | Koepke | B64D 45/00 |
| 2017/0328679 A1 * | 11/2017 | Smith | G05D 1/104 |
| 2017/0328683 A1 * | 11/2017 | Smith | F41G 7/308 |
| 2018/0031698 A1 * | 2/2018 | Wang | G01S 7/003 |
| 2018/0047294 A1 * | 2/2018 | Esposito | G08G 5/0008 |
| 2018/0088209 A1 * | 3/2018 | Wang | G01W 1/00 |
| 2018/0149745 A1 * | 5/2018 | Christianson | G01S 7/062 |
| 2018/0346152 A1 * | 12/2018 | Bryan | B64G 1/005 |
| 2019/0113618 A1 * | 4/2019 | Lukas | G01S 7/411 |
| 2019/0195601 A1 * | 6/2019 | Finkenberg | F41H 13/00 |
| 2019/0277964 A1 * | 9/2019 | Badin | G01S 7/412 |
| 2020/0149848 A1 * | 5/2020 | O'Shea | F42B 10/18 |
| 2020/0377234 A1 * | 12/2020 | Catledge | G08G 5/0091 |
| 2020/0398949 A1 * | 12/2020 | Kim | B63B 35/28 |
| 2021/0094703 A1 | 4/2021 | Catledge et al. | |
| 2021/0102790 A1 * | 4/2021 | Schorr | F02K 9/97 |
| 2021/0163148 A1 * | 6/2021 | Bosma | B64D 39/06 |
| 2021/0231425 A1 * | 7/2021 | Zemany | F41G 7/008 |
| 2021/0247513 A1 * | 8/2021 | Song | G08G 5/0039 |
| 2021/0295048 A1 * | 9/2021 | Buras | G09B 23/286 |
| 2022/0061016 A1 * | 2/2022 | Bennett | H04W 64/003 |

(56) References Cited

U.S. PATENT DOCUMENTS

| | | | |
|---|---|---|---|
| 2022/0061018 A1* | 2/2022 | Bennett | H04W 64/00 |
| 2022/0299296 A1* | 9/2022 | Clelland | F41H 11/02 |

FOREIGN PATENT DOCUMENTS

| | | | | |
|---|---|---|---|---|
| CN | 103241380 | A * | 8/2013 | B64C 37/02 |
| CN | 111630947 | B * | 1/2015 | |
| CN | 106383350 | A * | 2/2017 | |
| CN | 105398583 | B * | 11/2017 | B64G 1/002 |
| CN | 107014246 | B * | 7/2018 | F41F 3/04 |
| CN | 106628273 | B * | 11/2018 | |
| CN | 109204893 | A * | 1/2019 | B64G 1/645 |
| CN | 109737828 | A * | 5/2019 | |
| CN | 212084125 | U * | 12/2020 | |
| CN | 112977737 | A * | 6/2021 | B63B 11/00 |
| CN | 107193847 | B * | 9/2021 | G06F 16/951 |
| CN | 113656939 | A * | 11/2021 | G06F 30/20 |
| CN | 110868447 | B | 4/2022 | |
| CN | 114780142 | A | 7/2022 | |
| DE | 4433349 | A1 * | 3/1995 | B64G 1/005 |
| DE | 202015007948 | U1 * | 1/2016 | |
| EP | 2084636 | B1 * | 7/2012 | G01S 13/726 |
| EP | 2574557 | A2 * | 4/2013 | B64G 1/1078 |
| EP | 3081958 | A1 * | 10/2016 | G01S 13/87 |
| EP | 3128338 | A1 * | 2/2017 | G01S 13/95 |
| EP | 3633175 | A1 * | 4/2020 | B64G 1/002 |
| JP | S61178286 | A * | 8/1986 | |
| JP | S62210200 | A * | 9/1987 | |
| JP | H0299500 | A * | 4/1990 | |
| JP | H06289132 | A * | 10/1994 | |
| JP | H07196098 | A * | 8/1995 | |
| JP | 2002228400 | A * | 8/2002 | |
| JP | 2003522933 | A * | 7/2003 | |
| JP | 2009511121 | A * | 3/2009 | |
| JP | 2010281564 | A * | 12/2010 | |
| JP | 2019003316 | A * | 1/2019 | |
| JP | 2021049907 | A * | 4/2021 | |
| JP | 2021517088 | A * | 7/2021 | |
| JP | 2022097963 | A * | 7/2022 | |
| JP | 2022126919 | A | 8/2022 | |
| JP | 2022126920 | A | 8/2022 | |
| KR | 950011773 | B1 * | 10/1995 | |
| KR | 20110108435 | A * | 10/2011 | |
| KR | 20120066690 | A * | 6/2012 | |
| KR | 10-1371399 | B1 | 3/2014 | |
| KR | 20140094481 | A * | 7/2014 | |
| KR | 20140094482 | A * | 7/2014 | |
| KR | 20170126624 | A * | 11/2017 | |
| KR | 20180032455 | A * | 3/2018 | |
| NO | 321458 | B1 * | 5/2006 | F41G 7/224 |
| RU | 2175933 | C2 * | 11/2001 | B64C 25/08 |
| RU | 2314481 | C2 * | 1/2008 | |
| RU | 2338659 | C1 * | 11/2008 | |
| RU | 2508558 | C2 * | 2/2014 | G01S 5/0081 |
| RU | 2550299 | C2 * | 5/2015 | |
| RU | 2632559 | C2 * | 10/2017 | |
| RU | 2658545 | C1 * | 6/2018 | |
| RU | 2668145 | C1 * | 9/2018 | |
| RU | 2761253 | C1 * | 12/2021 | B64G 1/007 |
| UA | 39222 | C2 * | 6/2001 | |
| WO | WO-2006103774 | A1 * | 10/2006 | B64C 29/0025 |
| WO | WO-2008109778 | A2 * | 9/2008 | H04Q 9/00 |
| WO | WO-2009079045 | A2 * | 6/2009 | F41F 3/07 |
| WO | WO-2011096785 | A1 * | 8/2011 | B64G 1/002 |
| WO | WO-2014149184 | A2 * | 9/2014 | F02K 9/72 |
| WO | WO-2015113962 | A1 * | 8/2015 | B64C 39/024 |
| WO | 2016/105523 | A1 | 6/2016 | |
| WO | WO-2016097832 | A1 * | 6/2016 | H04B 7/18584 |
| WO | WO-2017153740 | A1 * | 9/2017 | B64G 1/22 |
| WO | WO-2019182229 | A1 * | 9/2019 | G01S 13/726 |
| WO | WO-2020051508 | A1 * | 3/2020 | H04B 7/1851 |
| WO | WO-2022046350 | A2 * | 3/2022 | |
| WO | WO-2022054067 | A1 * | 3/2022 | |
| WO | WO-2022064721 | A1 * | 3/2022 | |
| WO | WO-2022046350 | A9 * | 4/2022 | |
| WO | 2022176889 | A1 | 8/2022 | |
| WO | 2022176891 | A1 | 8/2022 | |

OTHER PUBLICATIONS

"Aerocapture design study for a Titan polar orbiter;" Conor A. Nixon, Frank Kirchman, Jaime Esper, David Folta, Alinda Mashiku; 2016 IEEE Aerospace Conference (pp. 1-16); Mar. 1, 2016. (Year: 2016).*

"Electromagnetic Space Launch Considerations;" Ian R. McNab; IEEE Transactions on Plasma Science (vol. 46, Issue: 10, pp. 3628-3633); Mar. 27, 2018. (Year: 2018).*

"Flexibility Management for Space Logistics via Decision Rules;" Chen et al. ; Arxiv ID: 2103.0896; Mar. 16, 2021.*

"Integrated maritime picture for surveillance and monitoring applications," Margarit et al. ; 2013 IEEE International Geoscience and Remote Sensing Symposium—IGARSS (pp. 1517-1520); Jul. 1, 2013 (Year: 2013).*

International Search Report and the Written Opinion of the International Searching Authority received from the Korean Intellectual Patent Office In International Application No. PCT/US2020/062504 dated Mar. 9, 2021.

Murakami, et al., "Space Traffic Management with a NASA UAS Traffic Management (UTM) Inspired Architecture", AIAA SciTech Forum, San Diego, California, 27 pages, Jan. 7-11, 2019.

Catledge, "Framework for Creating a National Space Launch Range: Laying Tracks to Space", 11 pages, submission to Space Florida on Jul. 12, 2018.

International Preliminary Report on Patentability (Chapter 1 of the Patent Cooperation Treaty) received in related International Application No. PCT/US2020/062504 dated Dec. 8, 2022.

Final Office Action for U.S. Appl. No. 17/105,763, dated Jun. 14, 2023, 15 pages.

Non-Final Office Action issued in U.S. Appl. No. 17/105,763 dated Sep. 28, 2022, 17 pages.

Zeitlin N.P., et al., "Ground and Launch Systems Processing Technologies to Reduce Overall Mission Life Cycle Cost," 2013 IEEE Aerospace Conference, 2013, pp. 1-20.

Zeitlin N.P., et al.; "NASA Ground and Launch Systems Processing Technology Area Roadmap," 2012 IEEE Aerospace Conference, pp. 1-19.

Catledge, et al., U.S. Appl. No. 17/105,763, "Launch on Demand" filed Nov. 27, 2020.

Mitchell, "DoD experiments on commercial spacecraft", 2009 IEEE Aerospace Conference, pp. 1-9, (Mar. 1, 2009).

Non-Final Office Action issued in U.S. Appl. No. 17/105,763 dated Feb. 28, 2024.

* cited by examiner

LAUNCH ON DEMAND

RELATED APPLICATIONS

This application claims the benefit of priority to U.S. Provisional Application No. 62/854,937, entitled "Launch on Demand" filed May 30, 2019, the entire contents of which are hereby incorporated herein by reference for all purposes.

SUMMARY

The systems, methods, devices, and non-transitory media of the various embodiments provide a dynamic space launch opportunity determination and coordination system that provides space launch customers and authorities with a live indication when a given space launch is both safe and compliant with launch objectives, dynamic launch window criteria. For ease of reference the system that receives data inputs and determines when safe and compliant launch windows are available is referred to herein as a "space launch service platform," which is not to be confused with a physical platform.

In various embodiments, the space launch service platform may receive data feeds from various static and dynamic data sources including, for example, satellite and orbital debris catalogs, airspace tracking systems, maritime tracking systems, weather monitoring systems, and range monitoring systems. In various embodiments, the space launch service platform may receive monitoring data from various launch site and launch vehicle sensors, such as frequency and global positioning system data, telemetry data, optics and surveillance data, and data from technicians at the launch site. In various embodiments, the space launch service platform may combine the data feeds and monitoring data and apply condition-based launch criteria to the combined data to dynamically determine launch windows and/or provide go/no-go decisions for a launch opportunity to a launch provider.

The integrated approach of the various embodiments leverages instrumentation, data and communication systems available from the National Airspace System (NAS), Marine Transportation System (MTS), and orbital catalog to enable safe passage for space vehicles, passengers, and payloads. The condition-based launch criteria of the various embodiments may improve mission assurance and public safety while simultaneously supporting a customer's launch on readiness schedule.

Various embodiments include methods for identifying launch opportunities. Embodiment methods may include receiving one or more data feeds; receiving monitoring data from a launch site; combining the one or more data feeds and monitoring data to generate combined launch data; determining whether a condition-based launch criteria is met based at least in part on the combined launch data; and indicating a launch opportunity in response to the condition based launch criteria being met. Various embodiments may further include displaying at least a portion of the combined data in a graphical user interface.

Various embodiments include methods including indicating a non-linear launch opportunity from a launch point on earth for a launch vehicle, wherein the non-linear launch opportunity defines a series of two or more non-periodic and discontinuous clear launch windows within a time span from a starting time until a computed set of orbital mechanics for the launch vehicle are no longer valid. In various embodiments, each of the two or more non-periodic and discontinuous clear launch windows may indicate times during which condition-based launch criteria are estimated to be met for the launch point and the launch vehicle. In various embodiments, each of the two or more non-periodic and discontinuous clear launch windows may have a length, such as 10 minutes, 20 minutes, 60 minutes, and each of the lengths may be different.

Further embodiments include a computing device having a processor configured with processor-executable instructions to perform operations of the methods summarized above. Further embodiments include a computing device including means for performing functions of the methods summarized above. Further embodiments include a non-transitory processor-readable storage medium having stored thereon processor-executable instructions configured to cause a computing device processor to perform operations of the methods summarized above. Further embodiments include a space launch service platform configured to perform functions of the methods summarized above.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The term "computing device" as used herein refers to any one or all of cellular telephones, smartphones, personal or mobile multi-media players, personal data assistants (PDA's), laptop computers, personal computers, servers, tablet computers, smartbooks, ultrabooks, palm-top computers, multimedia Internet enabled cellular telephones, and similar electronic devices that include a memory and a programmable processor. While specific examples are listed above, the various embodiments are generally useful in any electronic device that includes a processor and executes application programs.

While traditional spacelift relies on negotiated launch windows, various embodiments may achieve a higher level of success by using a federated architecture that may enable launch on demand opportunities. Various embodiments provide an integrated approach that leverages data about the National Airspace System, the Marine Transportation System, and an orbital object catalog to identify safe passage windows for the space vehicle, its passengers, and payload. Various embodiments may provide a condition-based launch criteria to improve a space vehicle's chance to launch on time. Various embodiments provide a system that may be a modular and cloud-based, infrastructure, thereby reducing personnel expenses and driving down costs for spaceport users. While traditional space launch relies on negotiated launch windows, various embodiments may achieve a higher level of launch flexibility, mission assurance, and safety by leveraging a federated data architecture leveraging multiple dynamic information sources and a real-time algorithm for determining launch safety and criteria compliance to enable more launch opportunities through crowded airspace while meeting all ground and down-range safety criteria.

Figure 1:
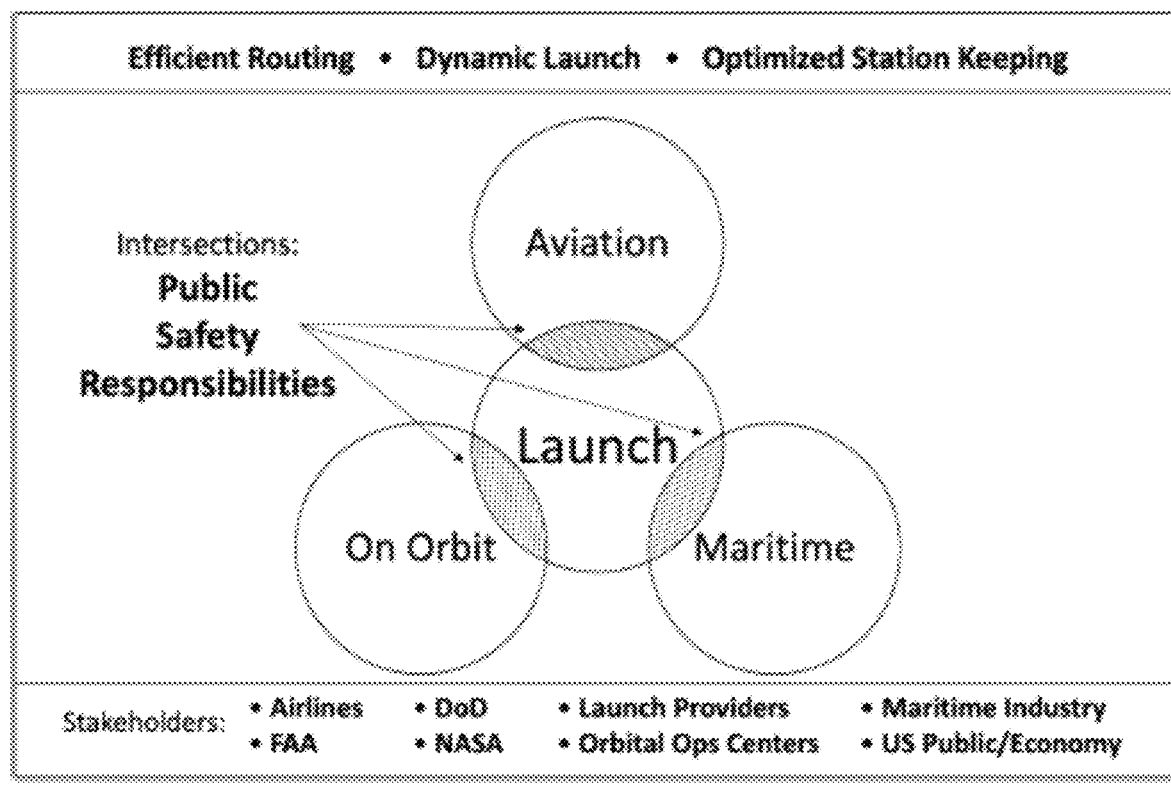
FIG. 1 is a diagram illustrating aspects that impact launch opportunities.

Launches have traditionally relied on windows to ensure public safety and allow unimpeded access through the air domain. FIG. 1 illustrates various aspects that influence launch opportunities. Complying with launch public safety requires access to decision-making information in the aviation, maritime, on orbit and launch domain. Unfortunately, as the number of launches increases, access becomes more inefficient. Launch opportunities are limited not just by vehicle performance, but also by interagency adjudication of airspace priorities that shorten the available windows. The current launch processes result in sub-optimized outcomes, such as delayed launches and rerouted/delayed air traffic. The current launch processes present challenges of a maximum of two launch opportunities being available in a forty-eight-hour period and contention for airspace. The current launch processes have negative financial impacts including scrub costs, unnecessary air rerouting and delay costs, and opportunity costs. To support a launch, safe operation, launch vehicle readiness, orbital mechanics, and weather conditions may all need to be within minimum tolerances for launch.

While satisfying the requirements associated with public safety is always of prime concern, various embodiments may also enable meeting the objectives of the ultimate spaceport customer, the launch operator. Launch operators are rewarded as a function of mission success or, stated another way, they pay a price for Loss of Mission (LOM). Failure to achieve orbit is the most dramatic of the LOM scenarios; however, there are several other scenarios that can have devastating consequences. As an example, loss of telemetry severely limits the data available to a launch operator who is conducting research and development flight operations. Currently Launch Collision Avoidance (L-COLA) algorithms used by the U.S. government may only support launch at the top of every minute, while various embodiments may support L-COLA to the individual second.

The simplest expression of Confidence is: Confidence equals one minus Risk. Similarly, the probability of mission success (Ps) is related to Loss of Mission by a complementary expression; namely Ps=1−LOM. Various embodiments' ability to perform near instantaneous forecasting of the variables provides a launch executive increased flexibility in determining when to launch, thereby reducing risk and increasing the likelihood of mission success.

Figure 2:
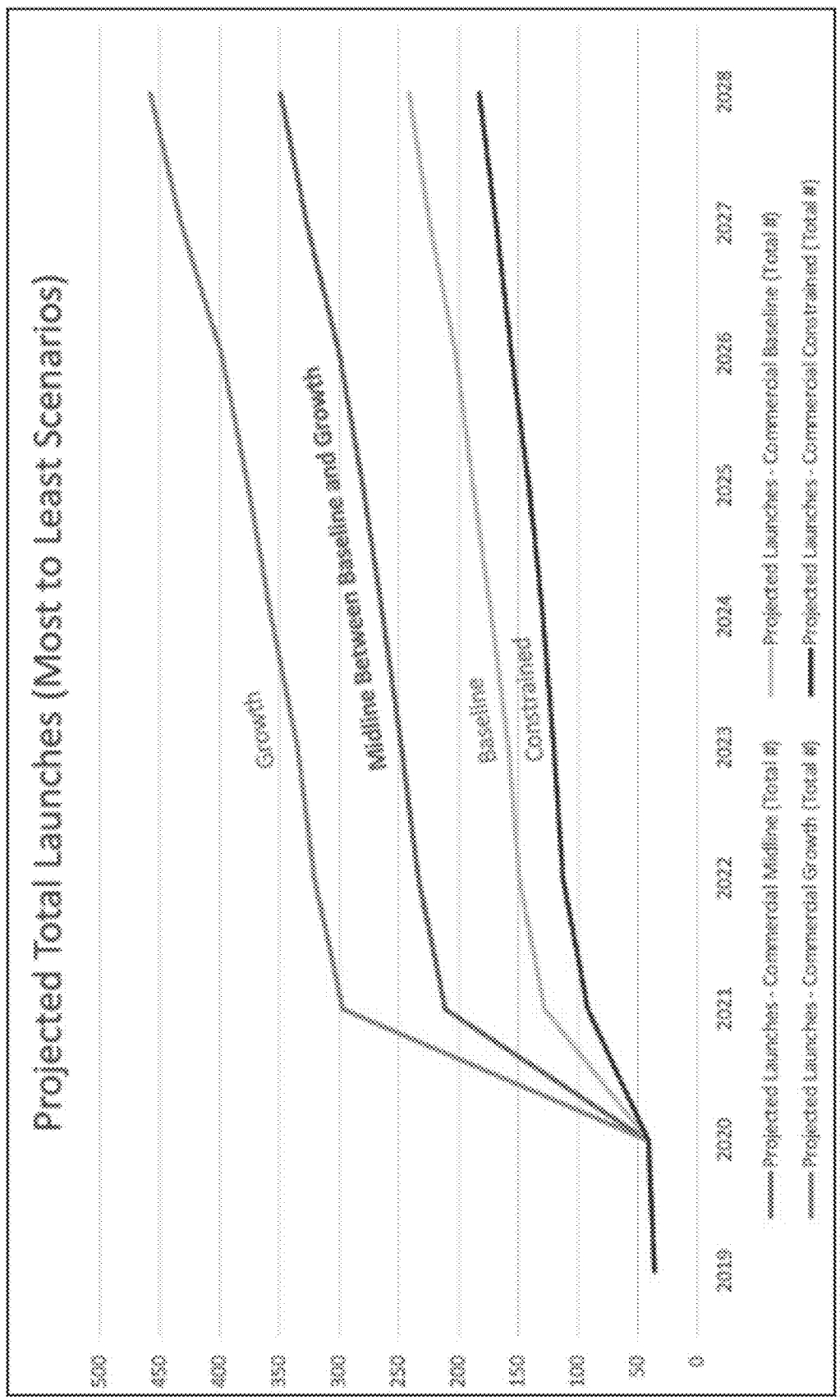
FIG. 2 is a graph of projected total launches in different scenarios.

The number of launches in the United States will almost certainly increase substantially in the next 10 years. Lowered access costs will release demand creating new profit opportunities, such as space tourism, for launch providers. FIG. 2 shows an estimate of projected total launches across four scenarios, from constrained to growth. Unless action is taken, the number of desired launches may soon exceed launch capacity.

Various embodiments may reduce the impact to the airspace while allowing more opportunities for achieving safe launches. Various embodiments may integrate information from the four information domains into a single common operating picture. Various embodiments may provide efficient routing, dynamic launch, and/or optimized station-keeping capabilities. Various embodiments may not compromise on safety, but may not upend inflexible whiteboard scheduling. Various embodiments leverage new technology and improved processes to allow for more frequent launches. And, by smartly bringing together advanced real-time services, various embodiments may enable space port users to incorporate business concerns, such as profit and capacity in their launch activity decisions. Various embodiments may enable greater launch capacity at each spaceport/range and may reduce launch provider costs by using a federated architecture.

Figure 3:
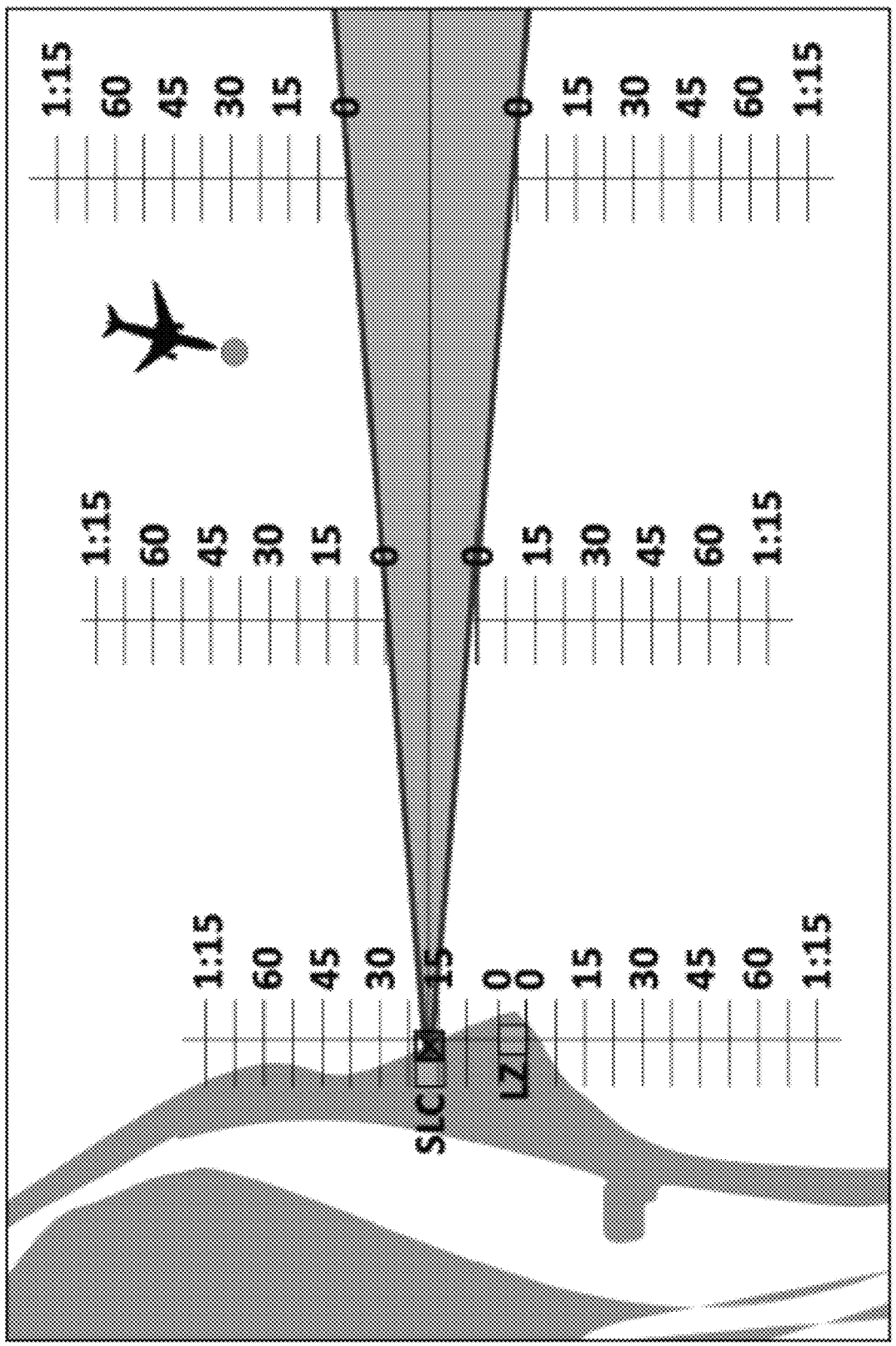
FIG. 3 is a graph of a launch window.
Figure 4:
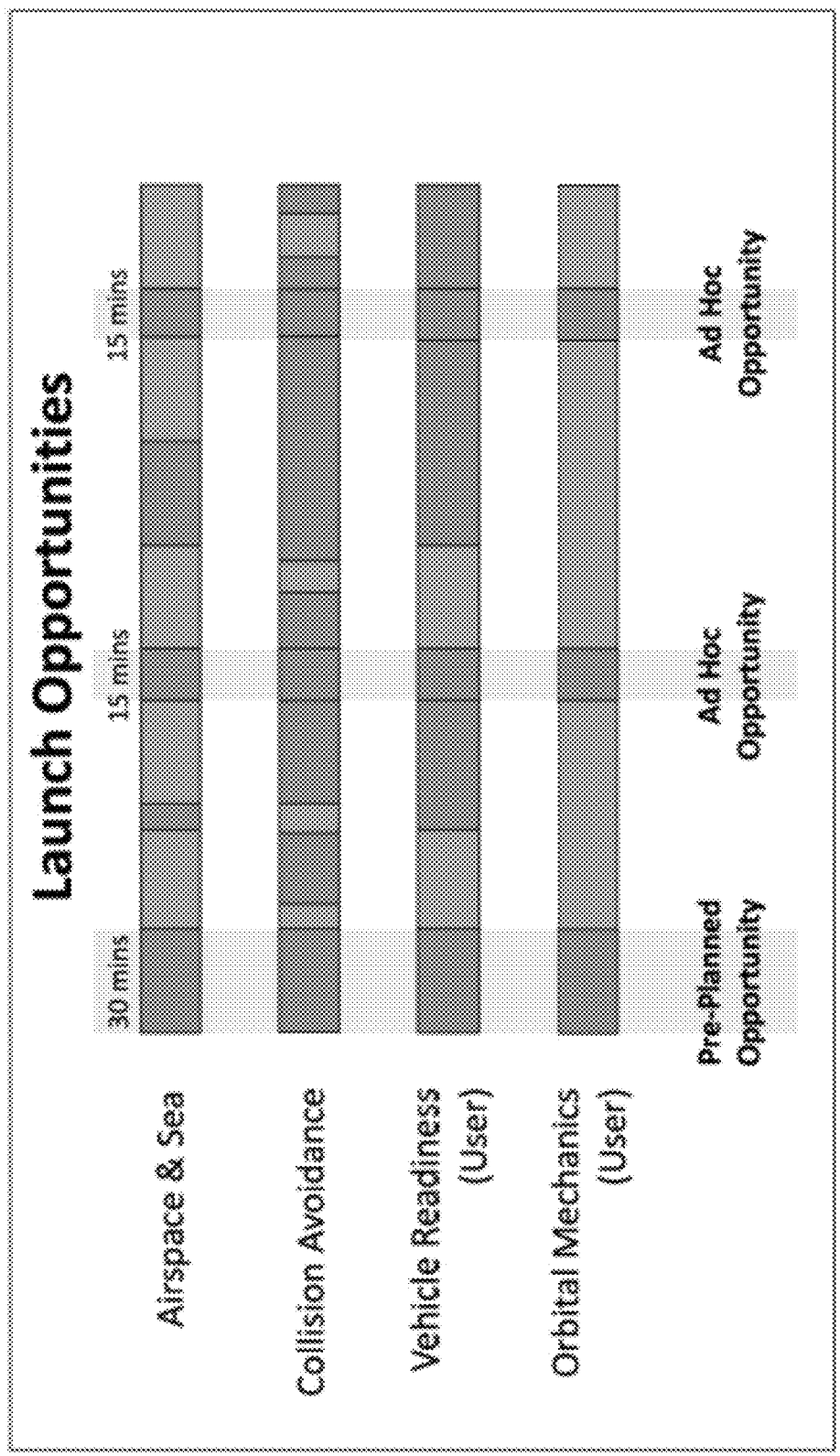
FIG. 4 is a graph of launch opportunities.

The primary user market for various embodiments may be space launch vehicle operators, the majority of which are focused on the vehicle or spacecraft payload. The infrastructure and workforce requirements for launch have historically been provided for these operators by the Department of Defense (DoD). The current process for launch providers is to request a launch window from the Federal Aviation Administration (FAA) for 1-4 hours. In response, the FAA will provide a launch window and divert air traffic around the launch hazard areas including launch, booster landing, and disposal locations. Hosting the busiest U.S. range, Florida has approximately 12 major air routes from Wilmington, NC, to South Florida that must avoid hazard areas. Posturing to avoid these areas requires airlines to carry additional fuel and often increases aircraft flight times, in part because tools and processes have not previously existed to dynamically open and close airspace based on launch timing. The contention for airspace may greatly reduce available launch opportunities. For example, the two-hour point in a desired window might be the optimal time to launch with regard to orbital mechanics but vehicle performance might allow the operator to launch anywhere in a four-hour window and still achieve the desired orbit. Thus, if the FAA allows only a two-hour window because of the impact of the closure on the airspace, the vehicle operator loses 50% of possible launch opportunities. This scenario happens frequently and often whatever event prevented the launch during the assigned window (e.g., weather, anomaly, etc.) might have been resolved prior to the end of the desired window. Thus, the ability to dynamically open and close airspace, or to attempt to launch at an opportune time in traffic could save the operator hundreds of thousands of dollars in scrub costs. FIGS. 3 and 4 illustrate launch opportunity windows.

Various embodiments may enable users to launch when the users are ready. By allowing more launch opportunities, various embodiments may save a launch provider hundreds of thousands of dollars in scrub costs that would result from vehicle, instrumentation, and weather delays. By shortening launch windows and making them responsive to need, various embodiments may enable the number of airline aircraft and maritime vessels rerouted to be decreased driving savings in fuel, transit times, and delay costs. By reducing scheduling constraints, various embodiments may enable launch providers, the DoD, and government to launch more frequently and with greater confidence in timeliness.

Figure 5:
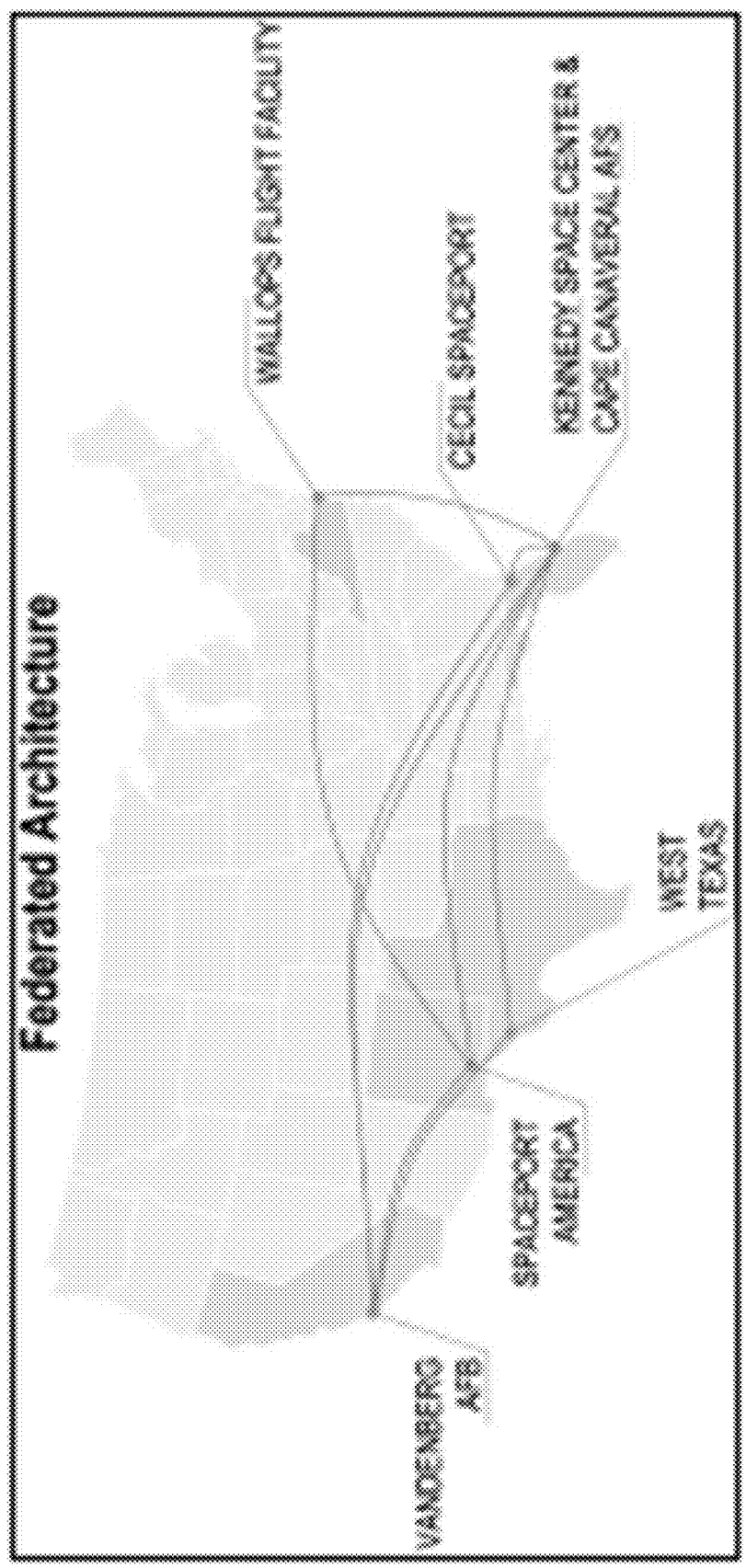
FIG. 5 is a map of a federated architecture of spaceports.

The major US ranges are each striving for efficiencies but they, fundamentally, continue to operate as in decades past. Various embodiments are different. Various embodiments may provide more than an incremental improvement over current launch service practice. By opening up new launch opportunities, various embodiments may add range capacity. And by taking advantage of the embodiment federated architecture as illustrated in FIG. 5, various embodiments may provide launches more efficiently, so launch providers and their customers save money on launch, aircraft, and maritime costs. Various embodiments may enable a range where space launch is a more routine transportation event integrated into a nation's airspace, logistics infrastructure, and economy.

Figure 6:
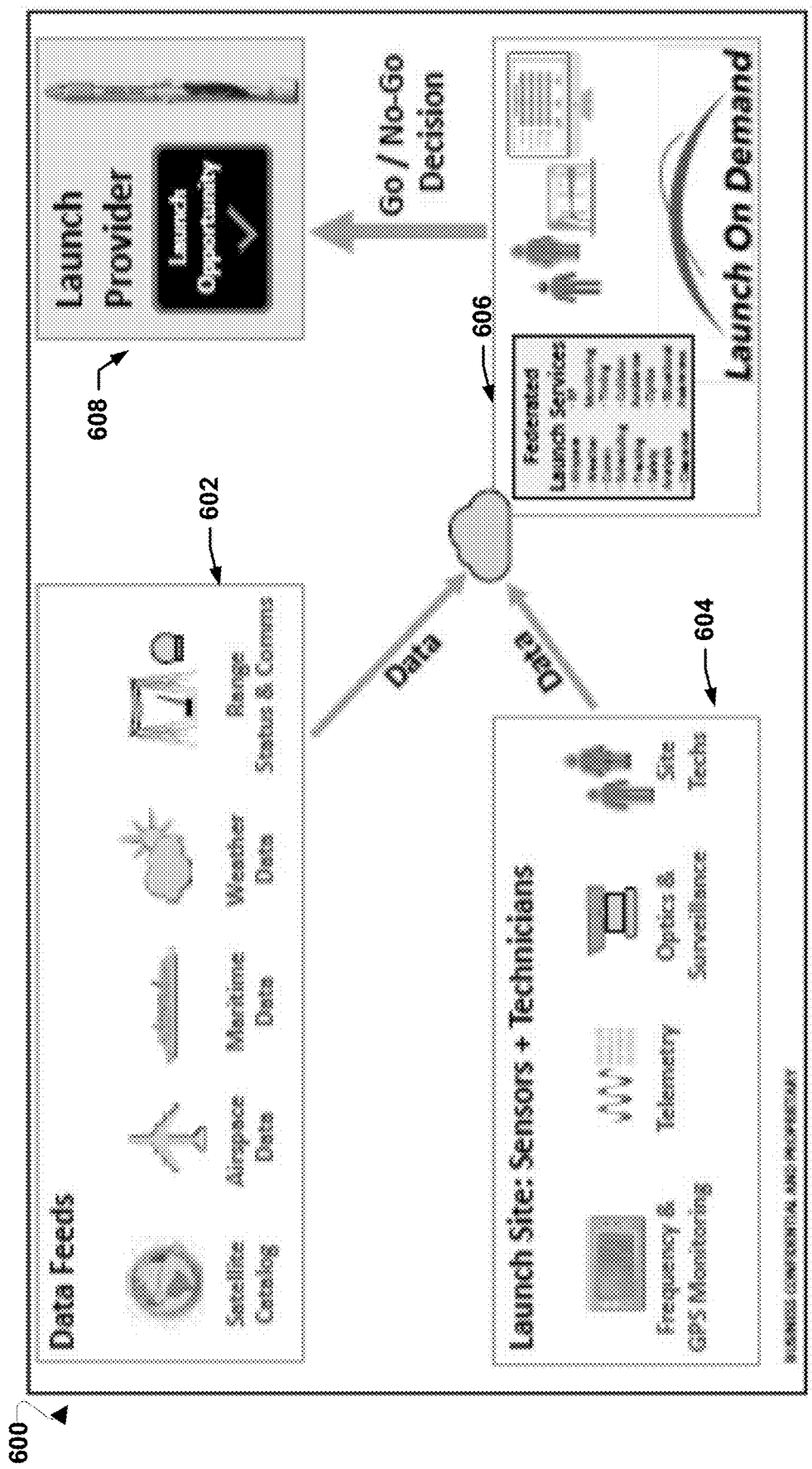
FIG. 6 is a system diagram of a launch on demand architecture.
Figure 7:
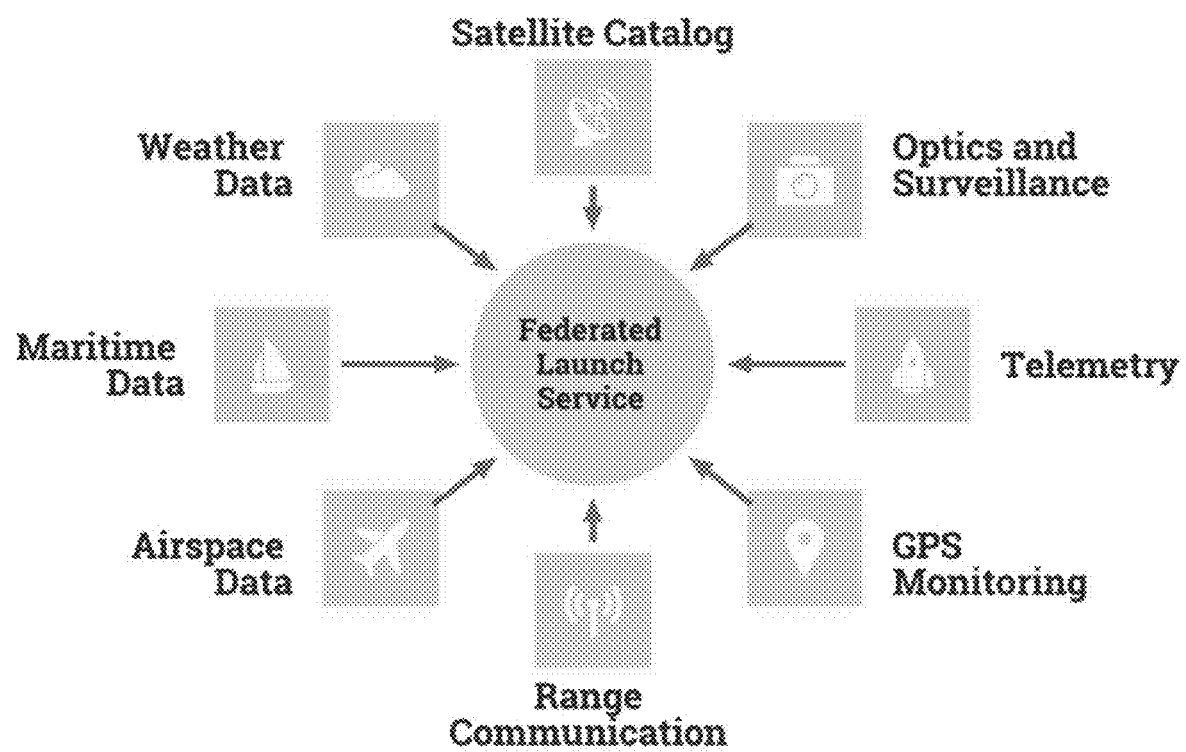
FIG. 7 is a block diagram illustrating inputs to a federated launch service according to an embodiment.

Various embodiments may provide a "Go/No Go" launch recommendation in accordance with a launch provider's FAA license. In some embodiments, the "Go/No Go" launch recommendation may be actual decisions regarding "Go/No Go" conditions that may control the actual launch of the vehicle. In some embodiments, the "Go/No Go" launch recommendation may be a recommendation that the launch provider may use to support the actual "Go/No Go" decision on a launch. In this manner, the launch recommendation may only be a true recommendation and the ultimate "Go/No Go" decision may rest with the launch provider. Launch sites in the embodiment federated architecture, an example of which is illustrated in FIG. 6, may take advantage of cloud-based capabilities and limited on premise infrastructure/technicians as illustrated in FIG. 7. This approach not only reduces specialized idle manpower, it grows and allows all ranges to take advantage of a smaller but more highly-experienced cadre of launch personnel. Specifically, FIG. 6 illustrates an embodiment system 600 in which a space launch service platform 606 receives one or more data feeds 602 and monitoring data 604. The data feeds 602 may originate from various systems providing data relevant to a space launch, such as a satellite catalog, an airspace tracking system, a maritime tracking system, a weather monitoring system, and/or a range monitoring system. The various systems may be terrestrial based systems, such as land or ship based radars, etc., satellite based systems, such as the global positing system, etc., or any other type system that may support providing a data feed 602. The monitoring data 604 may be frequency data, global positioning system data, telemetry data, optics data, surveillance data, and/or technician data. The monitoring data 604 and/or data feeds 602 may be sent to a network-based storage system, such as a cloud storage system, and retrieved by the space launch service platform 606 and/or may be sent directly to the space launch service platform 606. The space launch service platform 606 may combine the monitoring data 604 and/or data feeds 602 into combined launch data and may apply condition-based launch criteria to the combined launch data to determine whether a launch opportunity is present or not. In some embodiments, the space launch service platform 606 may indicate a launch opportunity in response to the condition-based launch criteria being met. For example, the space launch service platform 606 may indicate a go decision to a launch provider 608 in response to the condition-based launch criteria being met. In some embodiments, the space launch service platform 606 may indicate a no-go decision in response to the condition-based launch criteria not being met. In various embodiments the indication of a launch opportunity may be human readable, such as a visual message or icon displayed on a screen, and/or may be machine readable. Machine readable indications may support automated launch procedures in various embodiments. In various embodiments, the space launch service platform 606 may be configured to display at least a portion of the combined data in a graphical user interface, such as via a web portal and/or IPTV feed provided to a computing device of a launch provider 608 or other users.

Figure 8:
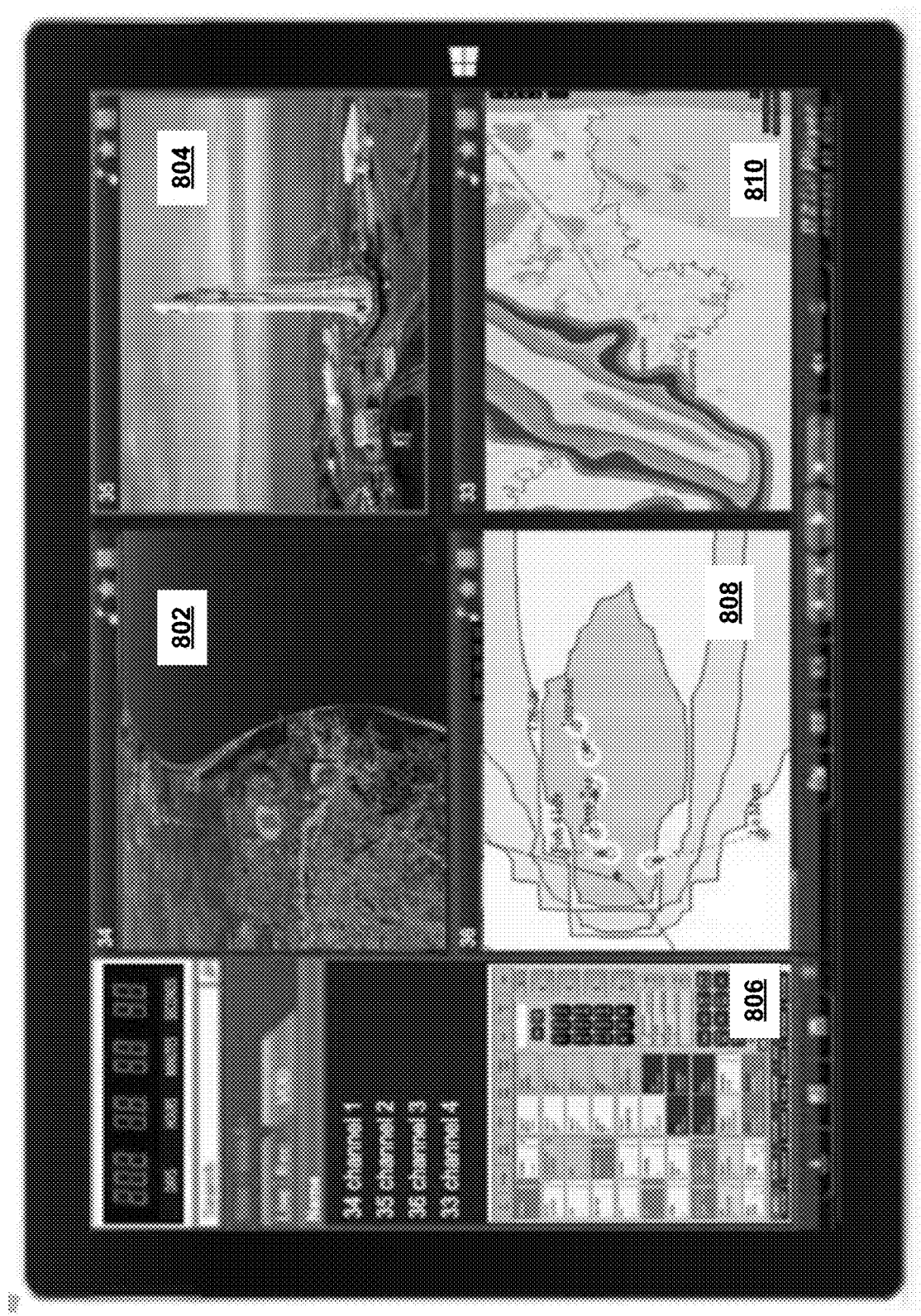
FIG. 8 illustrates an example graphical user interface displayed on a computing device according to various embodiments.
Figure 9:
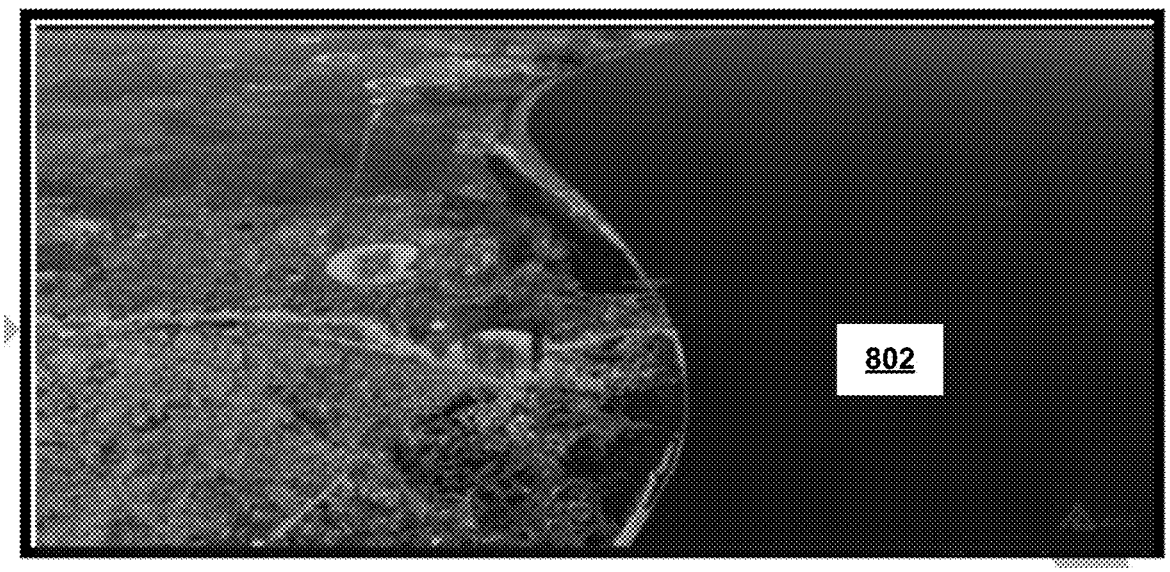
FIG. 9 illustrates a portion of the example graphical user interface of FIG. 8 showing a common operating picture.
Figure 10:
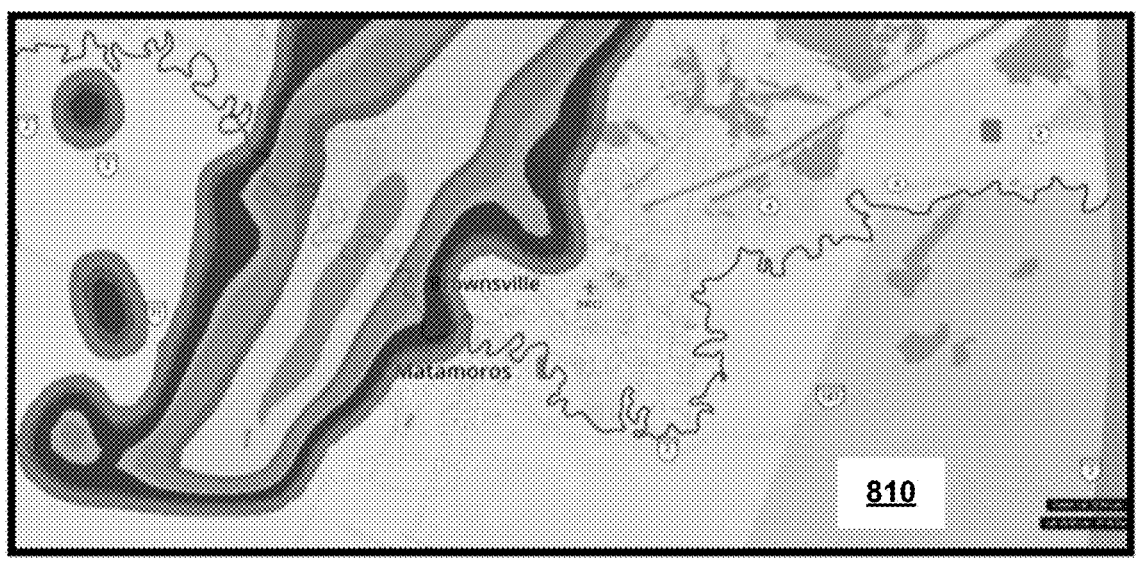
FIG. 10 illustrates a portion of the example graphical user interface of FIG. 8 showing weather services.
Figure 11:
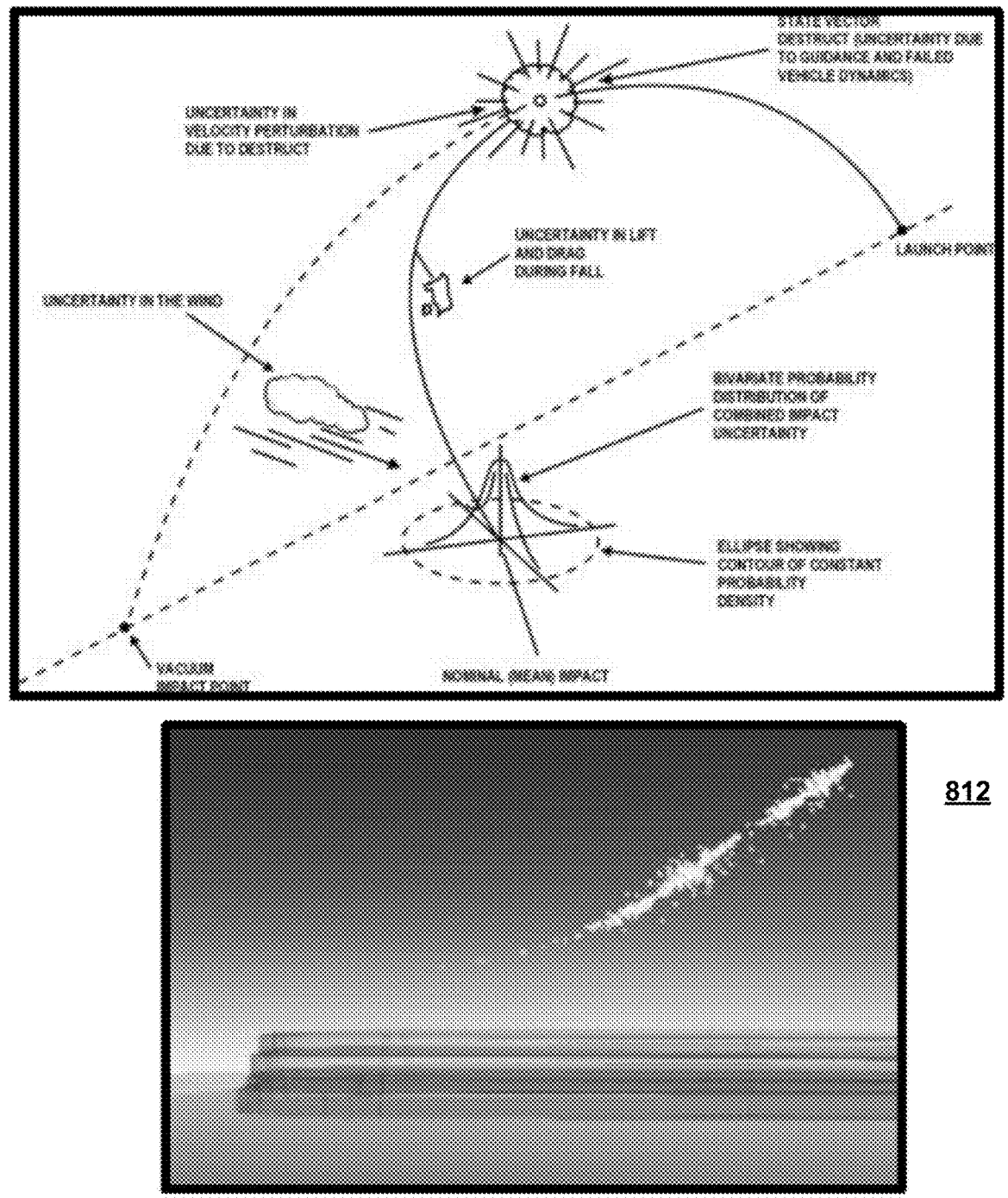
FIG. 11 illustrates a portion of the example graphical user interface of FIG. 8 showing debris analysis graphics and simulation services.
Figure 12:
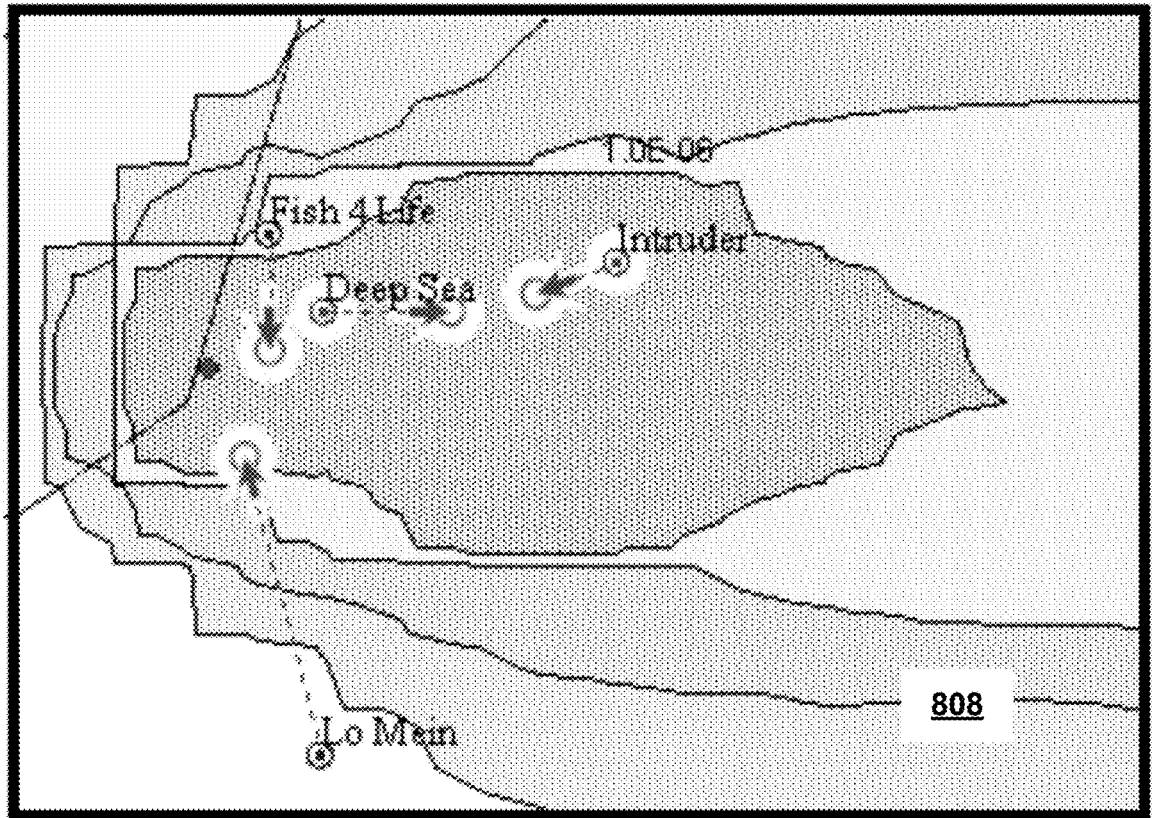
FIG. 12 illustrates a portion of the example graphical user interface of FIG. 8 showing a ship risk calculator visualization and tabular views.
Figure 12:
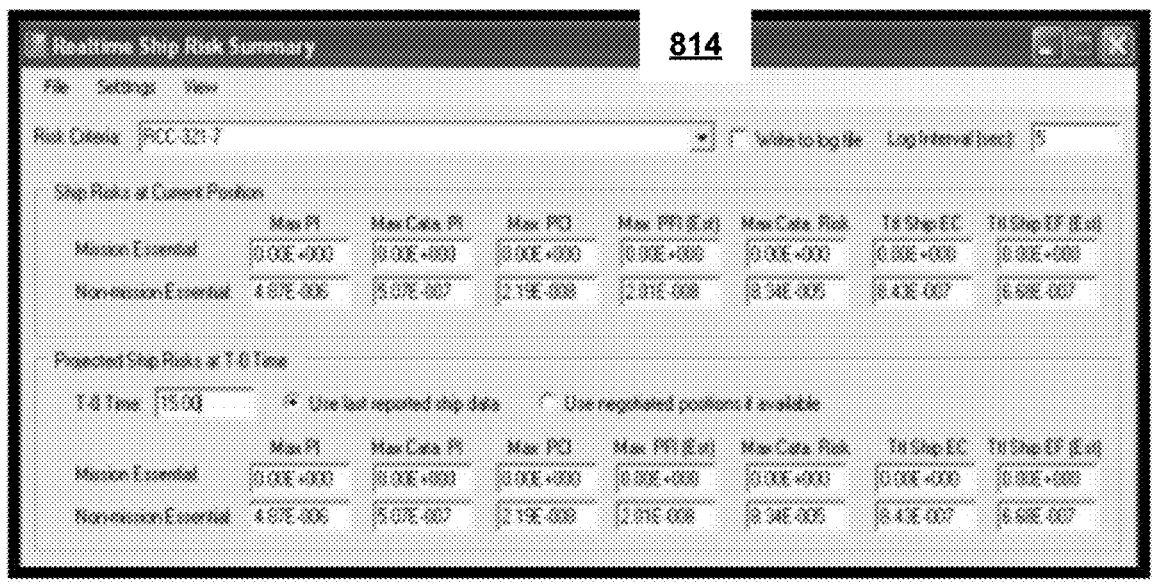
Figure 13:
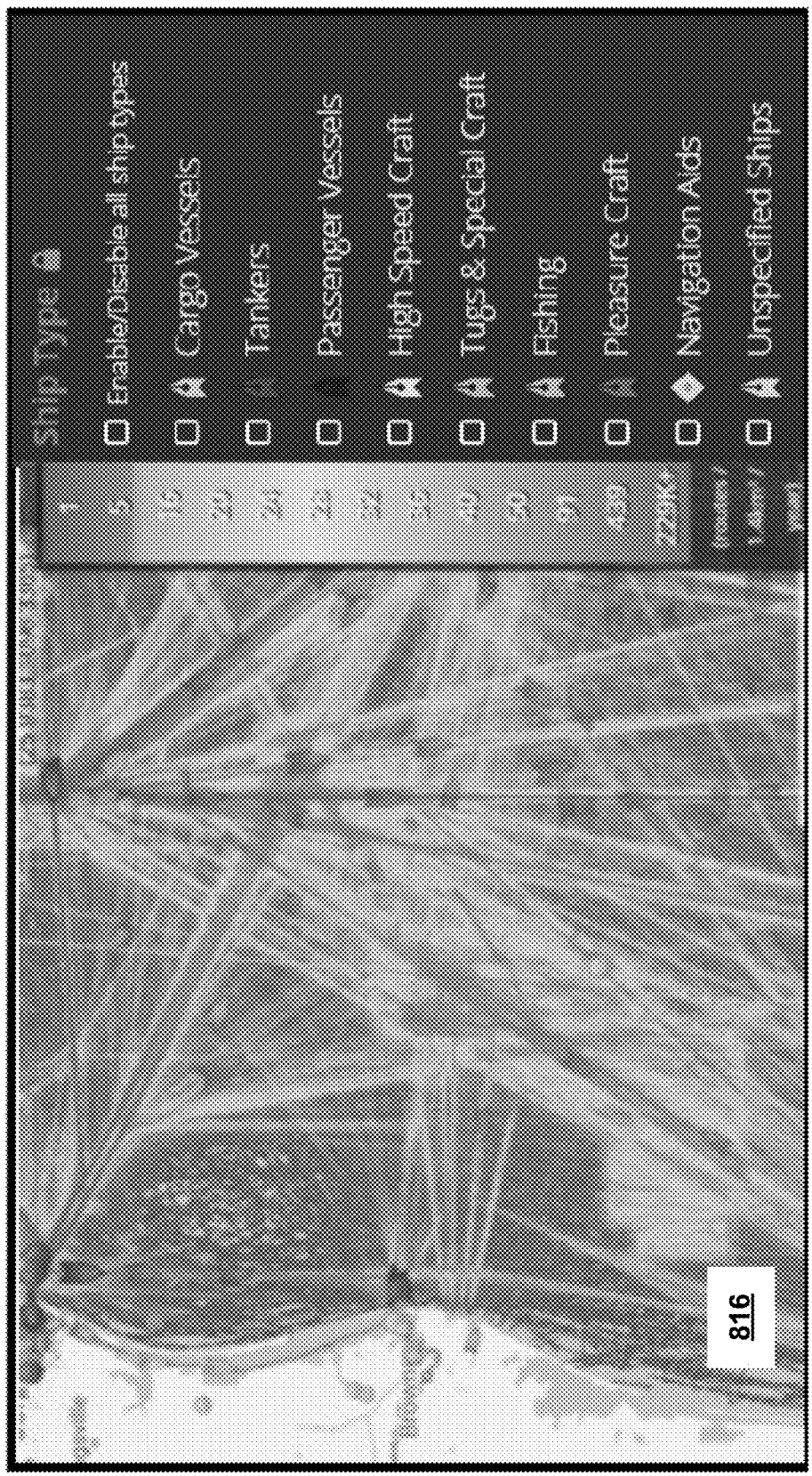
FIG. 13 illustrates a portion of the example graphical user interface of FIG. 8 showing maritime surveillance data.
Figure 14:
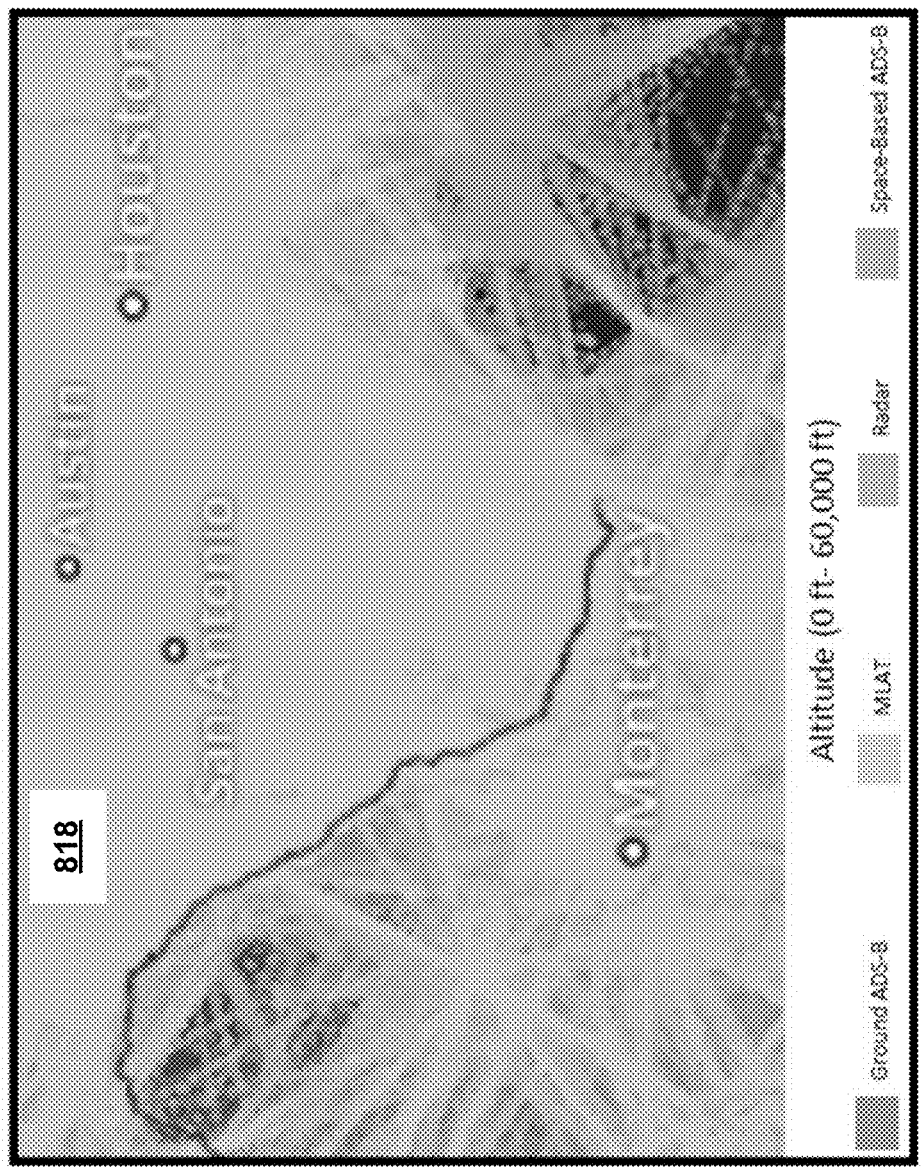
FIG. 14 illustrates a portion of the example graphical user interface of FIG. 8 showing air surveillance data.
Figure 19:
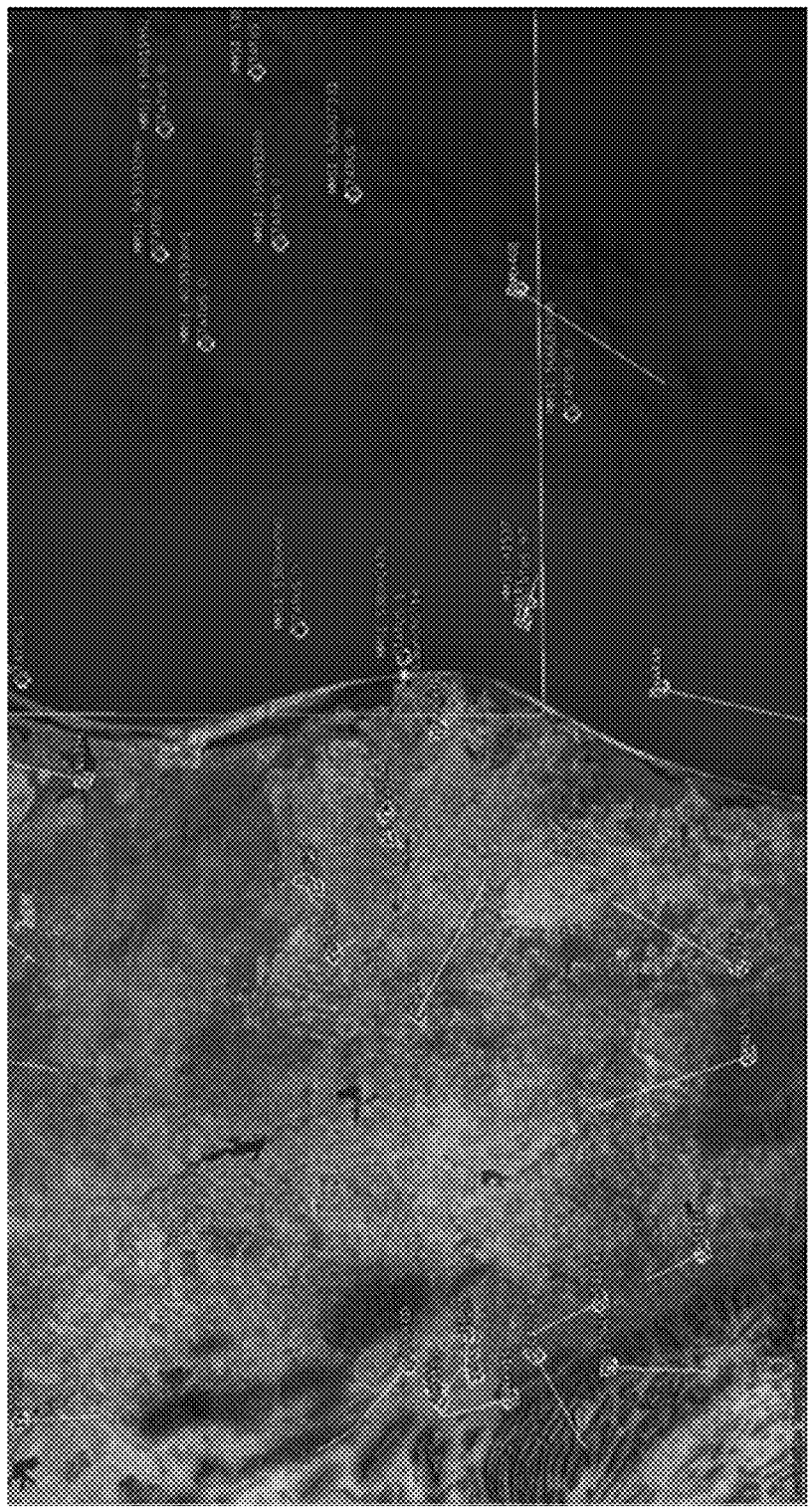
FIG. 19 illustrates an example view of a common operating picture displayed in graphical user interface according to various embodiments.
Figure 20:
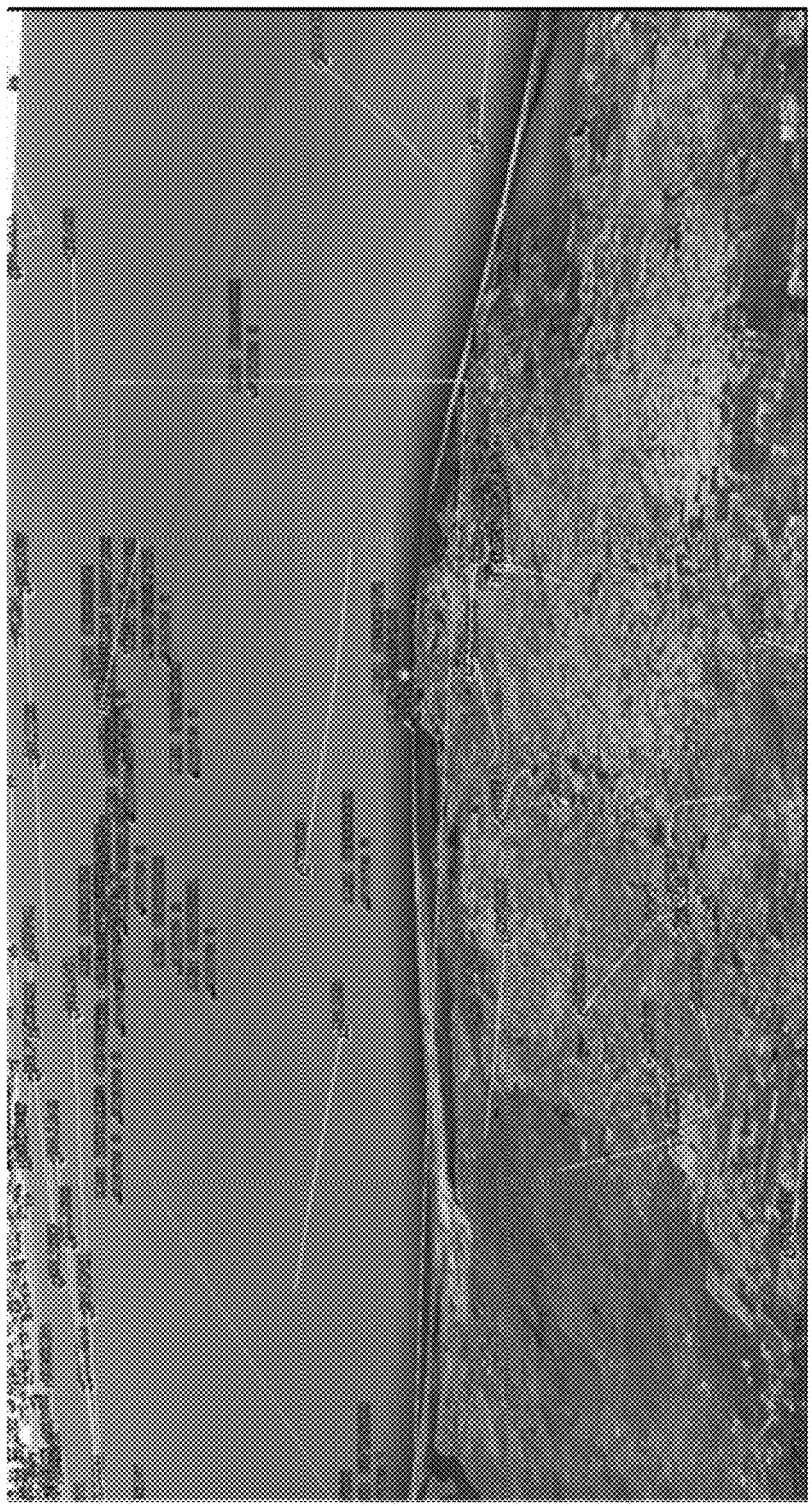
FIG. 20 illustrates an example view of a common operating picture displayed in graphical user interface according to various embodiments.
Figure 21:
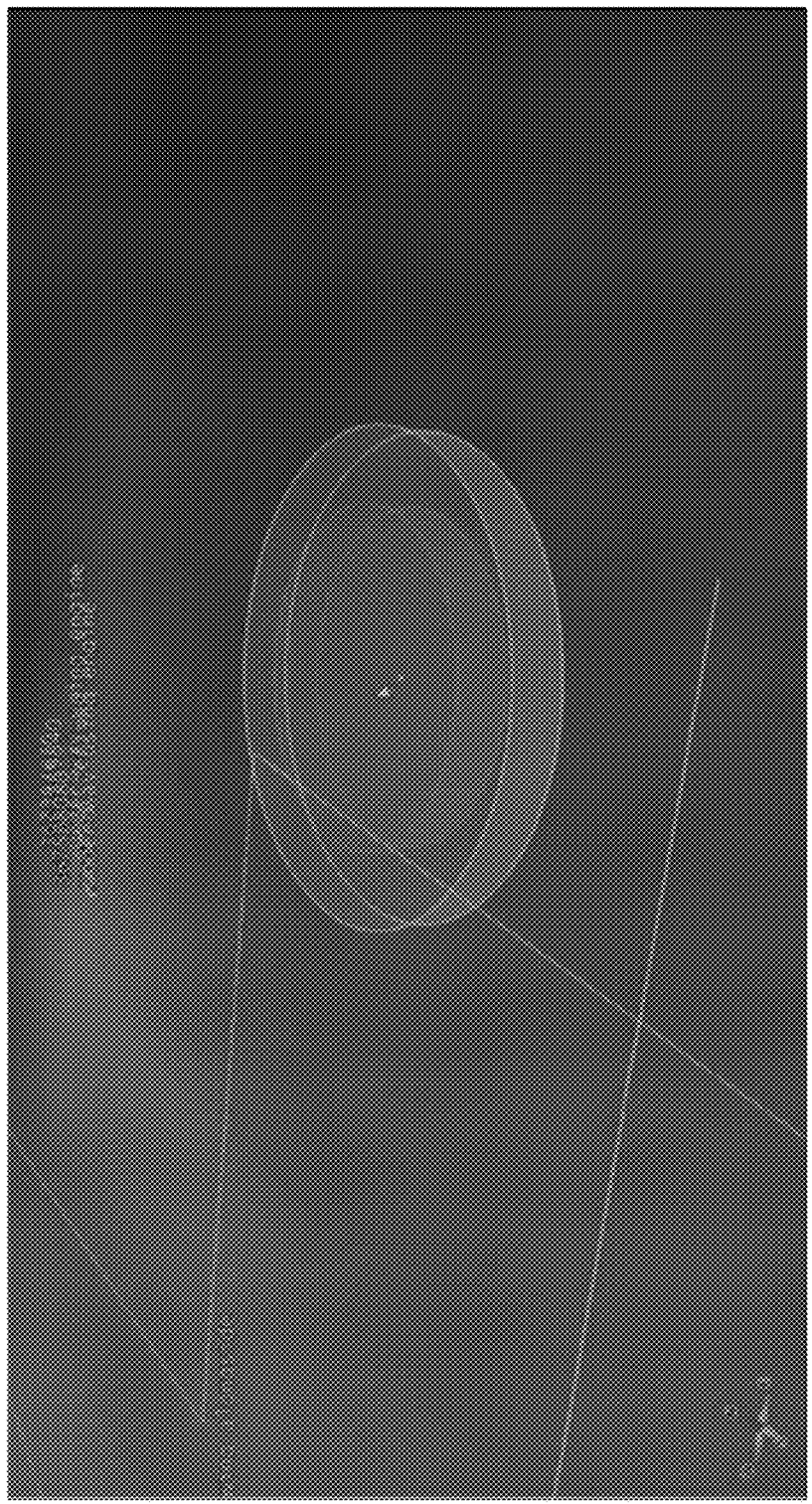
FIG. 21 illustrates an example view of a common operating picture displayed in graphical user interface according to various embodiments.
Figure 22:
FIG. 22 illustrates an example view of a system that may distribute information via IPTV channels according to various embodiments.

FIG. 8 illustrates an example of one such graphical user interface (GUI) 800 that may be provided by a space launch service platform 606 according to various embodiments. The GUI 800 may be displayed on a screen of a computing device, such as a laptop, smartphone, tablet, etc. The GUI 800 may provide various feeds of information to a user, such as a common operating picture 802, optical view of a launch site 804, a Voice Communications System (VCS) interface 806, a ship risk calculator visualization 808, a weather service plot 810. FIG. 9 shows a close-up view of the common operating picture 802. FIG. 10 shows a close-up view of the weather service plot 810. FIG. 12 shows a close-up view of the ship risk calculator visualization 808. In various embodiments, the user may manipulate the GUI 800 to change the displayed views and/or show more or less views. For example, the user may switch to displaying a debris analysis graphic 812 as illustrated in FIG. 11. As another example, the user may switch to displaying a tabular view 814 of the ship risk. As another example, the user may switch to displaying maritime surveillance data 816 as illustrated in FIG. 13. As another example, the user may switch to displaying air surveillance data as illustrated in FIG. 14. As another example, the user may switch to displaying different common operating picture views as illustrated in FIGS. 19, 20, and 21. As another example, the user may switch to displaying different optical camera views or other data feeds and/or monitoring data using a selection menu as illustrated in FIG. 22.

Currently, major range providers put customers in a queue managed on a whiteboard. The major range providers currently rely on reservation software tools that can't optimize range resources or launch schedules. Various embodiments provide scheduling tools, which are different from reservation tools. Currently the major range providers rely on reservation tools, not scheduling tools as described in the various embodiments.

Various embodiments handle a launch as a supply chain resource utilization activity. Various embodiments enable customers to launch sooner, more frequently, with greater schedule confidence, and at reduced expense. If a schedule change happens, various embodiments may enable immediately suggesting alternatives to reduce impacts and working to keep all customers on track.

Various embodiments may provide Launch Collision Avoidance type services that provide safety information to prevent collisions with orbital objects during launch. Various embodiments may provide a launch range responsible launching agency, "clear to launch" time intervals that consider a launch agency provided launch trajectory, desired launch window, and a catalog of resident space objects for the purposes of flight mission assurance. Various embodiments may compute and produce the required launch windows and T-0s. Various embodiments may receive the launch customer's launch trajectory, designated in the Earth Fixed Frame and motion characterized in Mission Elapsed Time (MET). MET is a relative time scale represented by consecutive launch vehicle position at specified intervals (e.g., seconds) moving forward from the desired launch time. Also, various embodiments may receive a desired launch window time interval, in civil time (absolute time scale). For example, 29 Apr. 19 20:00:00 UTC to 30 Apr. 19 00:00:00 UTC. The actual launch may occur at any time within this window. The catalog of resident space objects used will be the USSTRATCOM catalog of publicly available element sets. Object ephemeris modeling is based on these US computed two Line Element sets. The close approach range threshold will be 200 km for human-occupied structures and 20 km for other satellites, rocket bodies, and debris. In various embodiments, the required L-COLA calculations may be performed and the results provided to the spaceport and the launch customer with a report of launch conjunction time intervals to avoid within the designated launch window.

Various embodiments may provide Air/Sea/Orbit Surveillance and Coordination type services that provide coordination tools necessary to ensure safe flight while operating in the air/sea/space domains. In various embodiments, surveillance and coordination services may provide the coordination tools necessary to ensure safe flight while operating in the air/sea/space domains. Air Surveillance and Coordination may be provided by data feeds from flight tracking tools, such as those provided by FlightAware of Texas. Data evaluating and aggregating over 10,000 aircraft position messages per second may be processed and fused into a global flight data feed providing position and flight status data during all phases of the flight. Sea Surveillance and Coordination may track vessels on the ocean providing vessel positions, journey data, port calls, schedules, and higher order intelligence delivered timely and efficiently to satisfy our customer's needs and the company is a global ship tracking intelligence service.

Various embodiments may provide Telemetry Monitoring, Vehicle Tracking, and Situational Awareness type services that receive positional and performance information transmitted from the launch vehicle. Launch vehicle inflight location and performance data may be available to enable determining mission success or anomaly resolution. A telemetry signal may be processed and distributed in a user-specified format.

Various embodiments may provide Weather type services that provide wind, moisture, solar, cloud, sea states, and lightning reporting and predictions for launch customers to comply with FAA and DoD mandated Launch Commit Criteria. Weather support services provided by the various embodiments may involve the monitoring and analyzing weather conditions to include wind, moisture (precipitation), solar, cloud, sea states, and lightning reporting and prediction for launch spaceport customers leading up to and during launch. Weather instrumentation monitored may be available instrumentation at the launch site. The following list details instrumentation that will potentially be monitored in support of launch activities: Weather radar: Provides rain intensity and cloud top information out to a distance as far as 200 nautical miles. NEXRAD radar can also provide estimates of total rainfall and radial wind velocities; CGLSS: Detects and plots cloud to ground lightning strikes within a given distance to the launch site; NLDN: Plots cloud to ground lightning nationwide. Can be used to assess lightning beyond a site-specific lightning detection system; Rawinsondes: A balloon with a tethered instrument package which radios its altitude to the ground together with temperature, dewpoint and humidity, wind speed and direction, and pressure data. Rawinsondes reach altitudes exceeding 100,000 feet; Weather satellite imagery: Use high-resolution images to determine cloud, temperature and moisture information, severe weather, and lightning threat/evaluation of Lightning LCCs; Wind towers: Used for monitoring wind, temperature, and moisture (if outfitted with temperature and moisture sensors). Tower data is an important short-term forecasting tool and helps determine the direction and distance of toxic corridors in the event of a mishap; Maritime buoys: Buoys relay hourly measurements via satellite of temperature, wind speed and direction, barometric pressure, precipitation, sea water temperature, and wave height and period. Buoy data can be used for launch, landing, booster retrieval, and daily ground processing forecasts; Numerical weather models: Used to better understand and enhance forecasting accuracy for all weather parameters; and Space weather products: Used to determine the impact of the solar-terrestrial environment and its potential impact on space launch, spacecraft operations, and manned flight.

Various embodiments may provide Frequency Monitoring type services that monitor radio frequency spectrum to identify and geolocate interference to position, navigation and timing, communication, and datalink broadcasts.

Various embodiments may support Spectrum Management type services. The SPECTRA Software Tool Suite, a fully integrated and automated system may support spectrum management in various embodiments. The architecture may be modular and adaptable, based on client-server technology with a central database. The solution is applicable across all frequency bands. In some embodiments, the LS OBSERVER Spectrum Monitoring System may be integrated and customized onto vehicles, fixed and portable stations providing spectrum occupancy inventorying, long term spectrum situational awareness and network coverage measurements.

Figure 15:
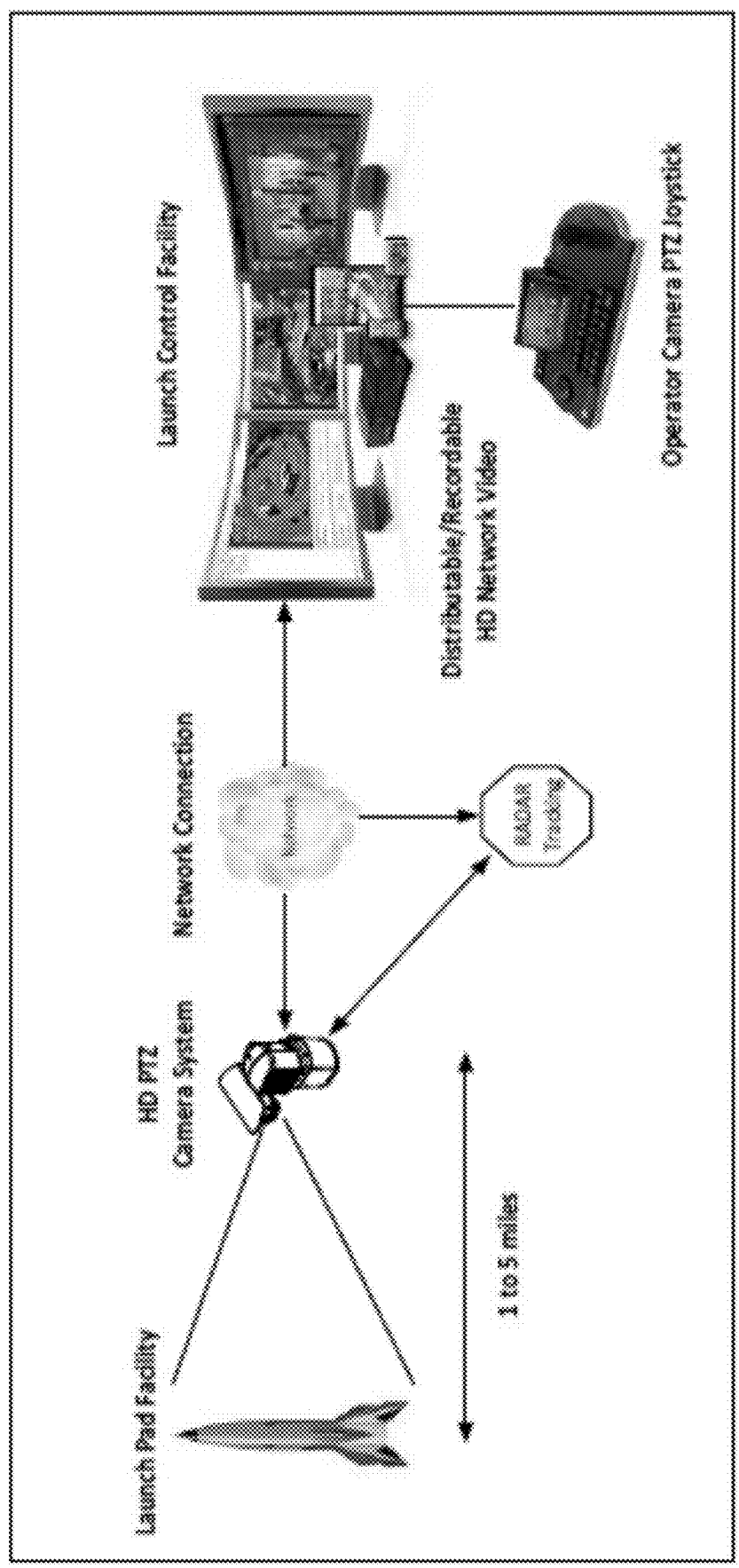
FIG. 15 is a block diagram illustrating components of an embodiment optics positioning system.

Various embodiments may provide Optics type services that provide electro-optical, infrared, and synthetic aperture radar images for sea-space/air-space clearance, launch vehicle anomaly resolution, and marketing products. Optics type services may include providing electro-optical, infrared, and synthetic aperture radar images for sea-space/air-space clearance. FIG. 15 is a block diagram illustrating components of an embodiment optics positioning system. In various embodiments, the optics positioning system may provide anomaly resolution surveillance as well as media video feeds when appropriate. The system may provide superior 1080p video image quality with powerful 30× optical zoom magnification for providing the proper coverage and detail of the launch pad facility from the remote system site location. The video and optics may enable the system to be placed from 1 to 5 miles from the launch facility to manage the various location installations, depending on launch customer needs and spacecraft/launch system design (horizontal and/or vertical). Authorized operators may control the Optical systems; azimuth, elevation, and zoom capability, remotely, and displayed over standard internet connections for precise management of the optical system view, as desired/required. The optical positioning system may incorporate H.264 video compression and encoding technology for providing low bandwidth, low latency, high-quality video images transported over standard ethernet infrastructures. To provide seamless integration for video and PTZ control, the camera positioning system may support industry standard ONVIF Profile S interface (Open Network Video Interface Forum) for providing standardized interoperability of 3rd party system IT devises/equipment. The high quality and rugged design of the optical system may enable reliable operation in extreme environmental conditions, in remote/difficult to access locations, with poor electrical and mechanical settings, while providing superior long-distance surveillance. The camera positioner may provide an operating temperature range of +75 C to −40 C (+167 degrees F. to −40 degrees F.). The system positioning capability offers a wide range speed capability of 0.05 to 45 degrees per second, with 360-degree continuous pan rotation, and +90 to −90-degree tilt range. The system operator may have enough holding torque to maintain operation in hurricane force wind and heavy vibration conditions which may occur during launch situations. For configuration management, the camera positioning system may include a web server, allowing password protected administration/configuration capabilities along with a full camera and positioning system control and viewing functions.

Figure 16:
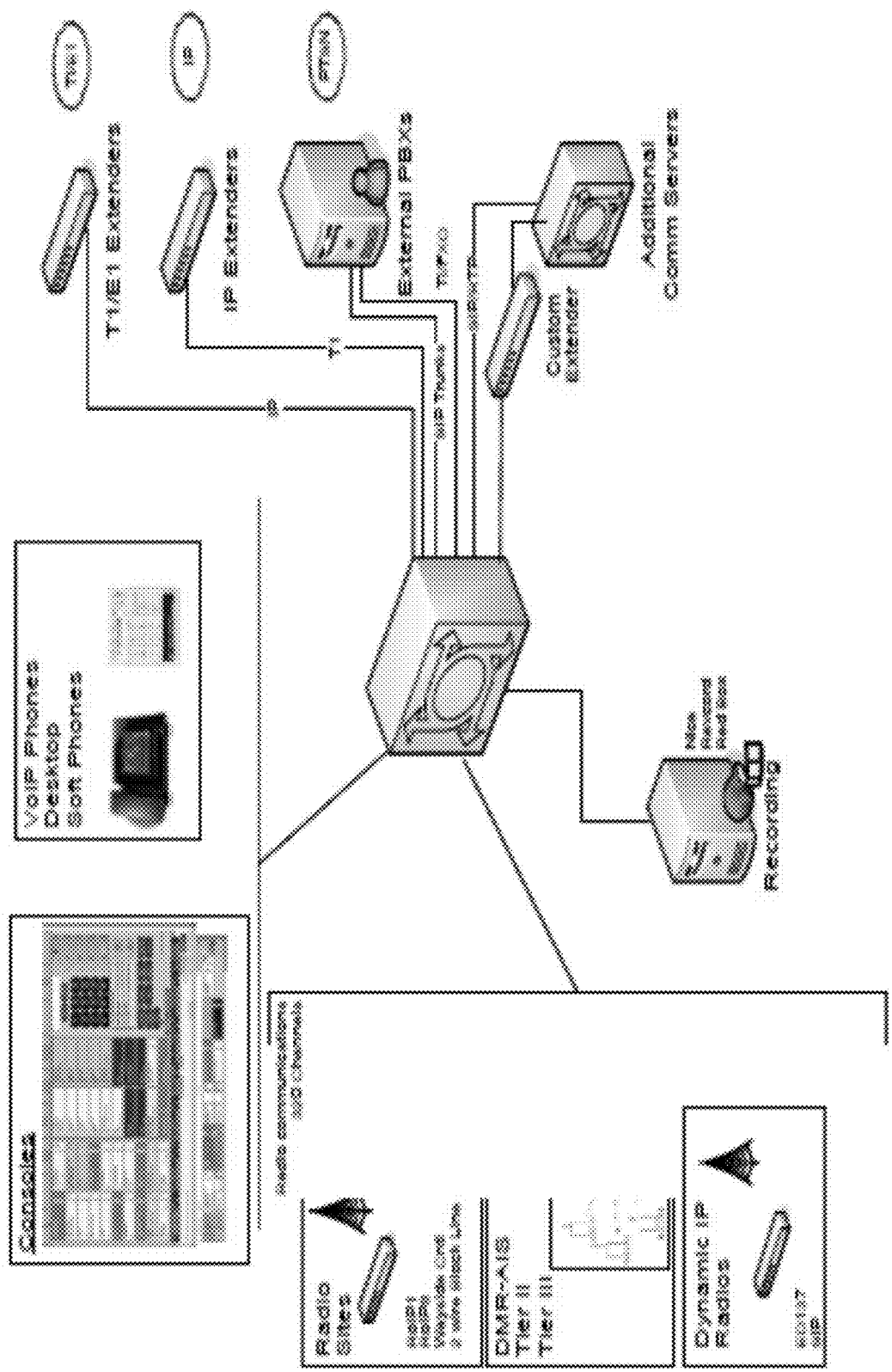
FIG. 16 is a block diagram illustrating an example Voice Communications System (VCS) architecture according to an embodiment.
Figure 17:
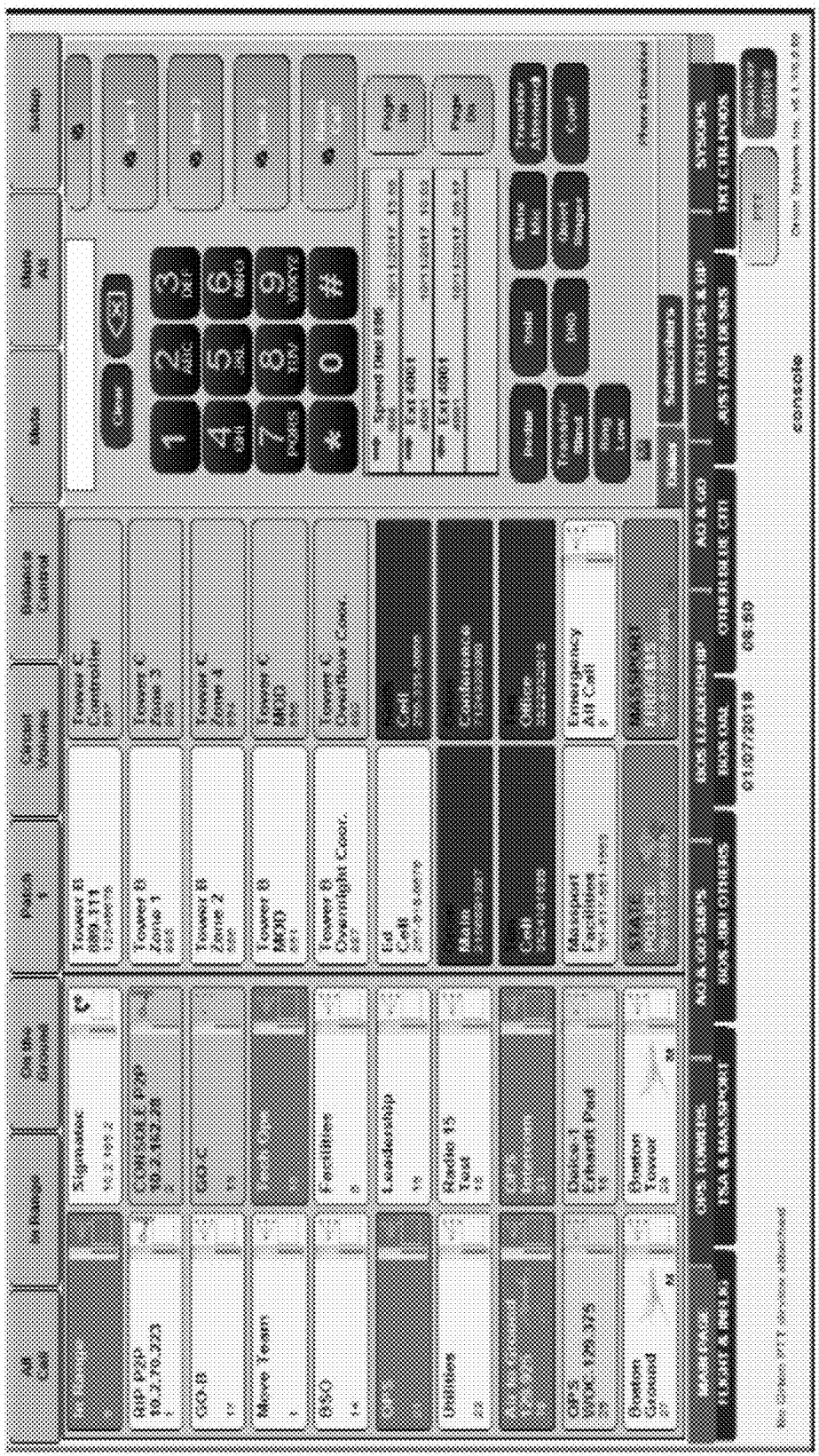
FIG. 17 illustrates an example graphical user interface for a VCS touch display according to an embodiment.

Various embodiments may provide Voice Transport type services that provide networks for launch countdown, payload interfaces, airspace warnings, instrumentation and weather delays, and anomaly discussions. In various embodiments, a Voice Communications System (VCS) architecture may be used to implement core voice switching capabilities anywhere within the tailored network. FIG. 16 is a block diagram illustrating an example Voice Communications System (VCS) architecture according to an embodiment. VCS may be an integrated voice communication system that combines advanced Voice digital switch technology with a simple to use/user interface. Systems may be structured for multiple operators and integrated radio and telephone communications creating a complete solution. The VCS may also be deployed in a redundant configuration consisting of two servers and a redundant hard drive to maintain the voice data. Redundant servers are functionally the same as a nonredundant server. Servers may be extended to form an extended VCS. This allows additional consoles and channels. This extension capability may also include remote sites. An example VCS may support up to 24 flexible conferences, the number of conferences operating will be easily configurable. Further system conference configuration may be fixed, which reduces the administrative overhead of creating conferences and adding assets to them. In some embodiments, the VCS may support up to 32 console devices unless expanded using either an extended or distributed VCS. The system may also initially support up to 96 SIP (tablet) devices, this may be extended to 128. There may also be 224 common interface devices (channels) which can access remote systems radios and other communication devices. The VCS may be equipped with the PBX module and may be capable of handling a multitude of calling features. Console devices may have individual extensions assigned and tablet devices will be required to use shared telephone access. In some embodiments, the VCS Touch Display capability provides this feature for radio information such as frequency and other configuration data. FIG. 17 illustrates an example graphical user interface for a VCS touch display according to an embodiment. This may be extended to accommodate other data sources which can further be displayed on console and tablet devices. The VCS Touch Display can also run on a user's desk/laptop simultaneously with other apps. Audio streaming capability may be supported in various embodiments. In the case of a console endpoint, the audio stream may provide stereo audio to the endpoint via headsets/earbuds.

Figure 18:
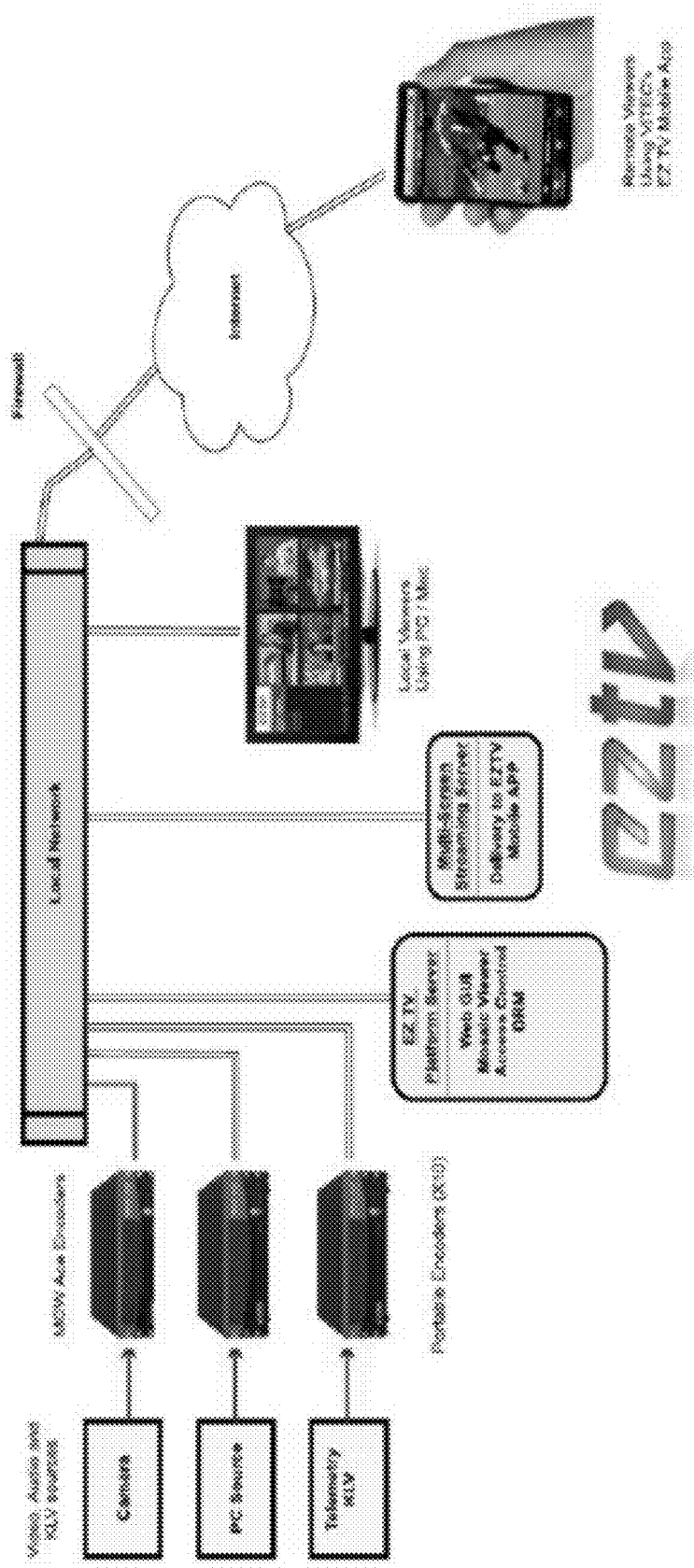
FIG. 18 is a block diagram illustrating an embodiment Data Transport Architecture.

Various embodiments may provide Data Transport type services that provide weather, airspace, maritime, frequency, situational awareness, and safety analysis decision-aiding tools. Data transport services that may be provided include: video stream transport, data management, and distribution to support the integration, display, and archive support services for weather, airspace and maritime monitoring, frequency monitoring, operational situational awareness, and launch safety/debris analysis. Various embodiments may capture and integrate many sources of real-time data/information, and rapidly process it in support of the spaceport operations. FIG. 18 is a block diagram illustrating an embodiment Data Transport Architecture. The data transport architecture may enable video and audio streams along with formatted computer-generated visualizations of data streams to be made available for spaceport and other customers via standard type laptop/desktop computers and IT devices. Portable devices with access to the network and proper authentication may likewise be able to view video and data streams made available through a proprietary mobile application. The system may utilize processing encoders that are also highly reliable, extremely efficient, and support multiple audio, video and data sources with transmission capabilities to ensure flexibility and robustness in supporting data transport requirements. In various embodiments, the Data Transport Architecture for KLV data may include support for STANAG 4609, AES stream encryption, and advanced stream protection using both Pro-MPEG FEC and Zixi protocols. Imaging feeds from various sources including optics systems, video cameras, computer graphics, and data sources may be connected to stand-alone portable encoders that generate transport streams which may be encrypted and protected before being delivered by the local IP network. An EZTV server manages access to the stream and provides a browser-based zero-footprint client which requires authentication using LDAP/active directory and provides decryption keys and access based on user rights assigned by the sysadmin. The integrated viewer within the EZTV client also provides the ability to create a mosaic viewing experience by enabling the display of multiple streams simultaneously and to display associated KLV metadata, if available. The Multi-Screen Streaming Server (MSSS) enables the video streams from the local network to be delivered across the public internet to remote viewers using the EZTV Mobile Pro Application. Users with the app installed on their mobile device (and properly configured to find and authenticate with the server) will be able to browse the list of available channels and choose/view the channel(s) selected.

Various embodiments may provide Safety Analysis and Licensing type services that provide ground and flight safety analyses to comply with FAA launch and reentry vehicle and site licensing requirements. Various embodiments may provide the capability to perform ground and flight safety analyses in accordance with FAR Part 417 to comply with launch and reentry vehicle and site licensing requirements in order to prepare a deliverable to launch providers consisting of license application submissions, availability studies, and launch countdown analyses, and associated presentations and documentation. In various embodiments, the execution of ground and flight safety analyses may include the ability to evaluate and model vehicle design for aerodynamic performance, structural integrity, debris lists, launch and reentry survivability, thermal demise, vehicle failure modes, reliability/failure probability, and failure trajectory simulation. Additionally, this service may comprise the ability to evaluate mission safety systems, including tracking and flight termination systems, and perform flight risk analyses for debris modeling, consequence analyses for inert and explosive debris, risk due to toxics and hazardous materials, and distant focusing overpressure analysis. In various embodiments, the trajectory information used for safety analysis and licensing type services may be provided by a third party, such as by the launch provider, vehicle operator, FAA, payload owner, launch site operator, etc., to a space launch service platform. In this manner, rather than developing trajectories, the space launch service platform may merely utilize trajectories provided by other entities. In order to support the calculations, a resource may maintain databases, such as population and weather. The generation of all risk metrics required by the FAA, including, but not limited to, collective risk to the public and ground, ship, and aircraft hazard areas may be performed in various embodiments, as well as the ability to define risk mitigation approaches, including mission rules, flight safety limits, and data loss flight times. As part of the risk metric generation and mitigation approaches, it may be necessary to maintain the ability to estimate the real-time risk to ships, boats, and aircraft. This service may include the capacity to assess hazardous ground operations and explosive siting requirements for storage and handling of solid and liquid propellants. Several physics-based software tools have been developed and may be used to evaluate launch risk. For example, the Trajectory Tool Kit (TTK) and the Range Risk Analysis Tool (RRAT) may be used to perform flight safety analyses. In various embodiments, the trajectories may be provided to the TTK and/or RRAT from third party entities separate from a space launch service platform. The TTK applies flight safety rules and vehicle structural limits to trajectories (trapping), which results in a collection of "breakup state vectors." From these breakup state vectors, subsequent calculations yield the hazards to risk-receptors and determine the consequences. TTK also assists in the determination of flight safety rules and helps to ensure mission rules meet risk mitigation objectives. TTK may be used to develop mission rules, flight safety limits, and data loss flight times for every mission from the USAF Western Range. RATT calculates and displays hazards and risks due to launch and reentry vehicle planned and malfunction debris. Fast-running vulnerability models are applied to determine structural damage and injuries to people inside buildings and outdoors, on ships, and in aircraft. Additionally, the Airborne Vehicle and Rocket Analysis software suite, which provides TTK and RRAT capabilities in a commercially available platform. The Launch Area Toxic Risk Assessment-3D (ATRA3D) computation engine may be included in the Toxic Analysis Interface (TAI) and computes the hazard and risk to people from toxic gases produced by normal and aborted rocket launches. LATRA3D combines vehicle failure modes, failure rates, propellant combustion, flight dynamics, vehicle fragmentation, 3-dimensional wind fields, population distributions, sheltering effects and human vulnerability to produce casualty expectations, risk profiles, and toxic hazard corridor information. The Blast Distant Focusing Overpressure (Blast DFO) tool computes risk associated with window breakage due to significant air blast resulting from a failed launch. The Blast DFO tool is often run pre-launch to assess launch availability. In the launch countdown phase, the latest atmospheric data is used. The Facility Siting Database and Analysis (FSDAn) tool may be a GIS-based application used to automate the preparation of a facility siting analysis, and HAZX is a standalone GUI/GIS-based application used to assess the effects of an explosion or a toxic chemical release on building occupants and evaluate blast mitigation schemes. Together these tools support facility siting involving liquid and solid propellants. Additional tools for generating ship/boat and aircraft hazard areas and computation of real-time risk may be used in various embodiments. Automated functionality generates graphics and data for issuing Notices to Mariners and defining Temporary Flight Restrictions. The real-time ship risk tool (inside RRAT) allows for negotiation of ship position in the launch countdown. Various embodiments may properly compute aircraft risk, and RRAT may include advanced calculation capability. RRAT's aircraft corridor calculation allows flights on specific azimuths through hazard areas and may be extended to operate like the real-time ship risk calculation. Additionally, real-time hazard volumes may be computed after a failure occurs. The output of these tools may allow for the creation of the deliverables needed to support license application submissions.

Various embodiments may leverage the Autonomous Flight Safety System (AFSS). The AFSS may provide an onboard safety system that may remove the need for a human controlled post-launch decision. AFSS may automate real-time post-launch decisions and may automate the command destruct functions. Additionally, AFSS may provide a reduction in the instrumentation and manpower requirements for safety infrastructure for launches.

Various embodiments may enable the efficient use of infrastructure and manpower. Various embodiments may enable central management of air, maritime, and orbital domains for a launch. Various embodiments may standardize flight safety approval. Various embodiments may reduce customer costs. Various embodiments may provide additional launch opportunities.

Various embodiments may integrate and manage complex data from multiple systems to support spaceport integration and launch operations (SILO). Various embodiments may integrate real-time and near real-time data into a reliable command and control series of displays suitable for instantaneous launch operations decision making support.

The integrated approach of the various embodiments leverages instrumentation, data and communication systems available from the National Airspace System (NAS), Marine Transportation System (MTS), and orbital catalog to enable safe passage for space vehicles, passengers, and payloads. The condition-based launch criteria of the various embodiments improve mission assurance and public safety while simultaneously supporting a customer's launch on readiness schedule.

As described above, the systems, methods, devices, and non-transitory media of the various embodiments provide an integrated, data-driven, real-time space launch service platform. In various embodiments, the space launch service platform may receive data feeds from various data sources, such as satellite catalogs, airspace tracking systems, maritime tracking systems, weather monitoring systems, and range monitoring systems. In various embodiments, the space launch service platform may receive monitoring data from various launch site and launch vehicle sensors, such as frequency and global positioning system data, telemetry data, optics and surveillance data, and data from technicians at the launch site. In various embodiments, the space launch service platform may combine the data feeds and monitoring data and apply condition-based launch criteria to the combined data to dynamically determine launch windows and/or provide go/no-go decisions (and/or recommendations) for a launch opportunity to a launch provider. In some embodiments, the "Go/No Go" launch decision/recommendation may be actual decisions regarding "Go/No Go" conditions that may control the actual launch of the vehicle. In some embodiments, the "Go/No Go" launch decision/recommendation may be a recommendation that the launch provider may use to support the actual "Go/No Go" decision on a launch. In this manner, the launch decision/recommendation may only be a true recommendation and the ultimate "Go/No Go" decision may rest with the launch provider.

Figure 23:
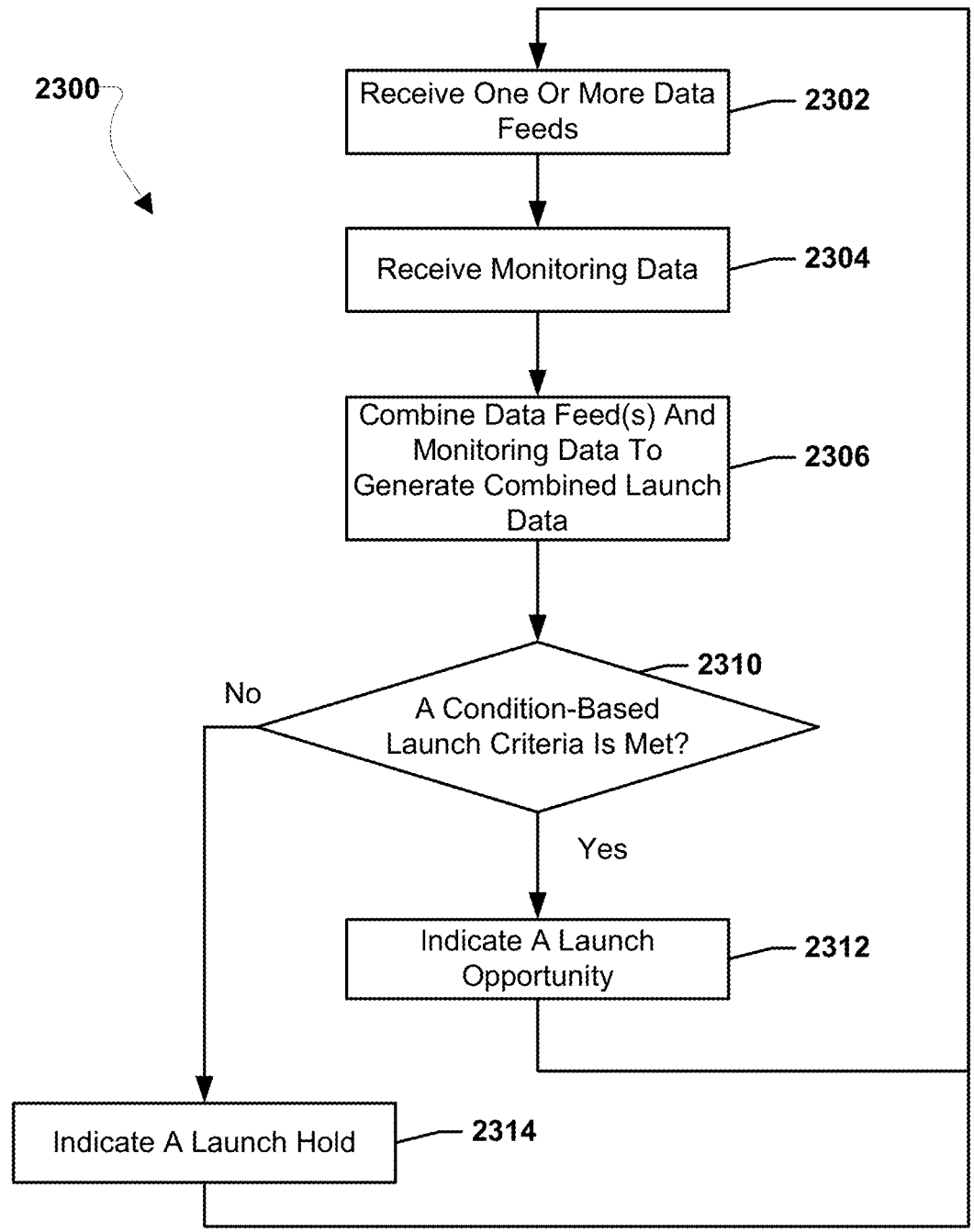
FIG. 23 is a process flow diagram illustrating an embodiment method for identifying launch opportunities.

FIG. 23 illustrates an embodiment method 2300 for identifying launch opportunities. The method 2300 may be performed by a processor of a space launch service platform (e.g., space launch service platform 606).

In block 2302, the processor may receive one or more data feeds. The data feeds may originate from various systems providing data relevant to a space launch as described above, such as a satellite catalog, an airspace tracking system, a maritime tracking system, a weather monitoring system, and/or a range monitoring system.

In block 2304, the processor may receive monitoring data from various sources and of various types as described above. The monitoring data may be frequency data, global positioning system data, telemetry data, optics data, surveillance data, and/or technician data.

In block 2306, the processor may combine the one or more data feeds and monitoring data to generate combined launch data as described above. Combining the one or more data feeds and monitoring data may include time-synchronizing the data feeds and monitoring data.

In block 2310, the processor may determine whether a condition-based launch criteria is met. A condition-based launch criteria may be a go/no-go criteria that governs whether a space vehicle is safe to launch at a certain time from a certain space port.

In response to determining the condition-based launch criteria is met (i.e., determination block 2310="Yes"), the processor may indicate a launch opportunity in block 2312. For example, the processor may indicate a go decision to a launch provider in response to the condition-based launch criteria being met. In doing so, the processor may generate one or more displays on a GUI providing relevant information to the users of the platform, with the displayed interface being generated for the particular role of each particular user or based upon menu selections of available GUI displays and interface options. In some embodiments, the launch opportunity may be an actual decision regarding "Go/No Go" conditions that may control the actual launch of the vehicle. In some embodiments, the launch opportunity may be a recommendation that the launch provider may use to support the actual "Go/No Go" decision on a launch. In this manner, the launch opportunity may only be a true recommendation and the ultimate "Go/No Go" decision may rest with the launch provider.

In response to determining the condition-based launch criteria is not met (i.e., determination block 2310="No"), the processor may indicate a launch hold in block 2314. For example, a launch hold may be an indication that it is not safe to launch at a given time. In doing so, the processor may generate one or more displays on a GUI providing relevant information to the users of the platform, with the displayed interface being generated for the particular role of each particular user or based upon menu selections of available GUI displays and interface options. In some embodiments, the launch hold may be an actual decision regarding "Go/No Go" conditions that may control the actual launching/holding of the vehicle. In some embodiments, the launch hold may be a recommendation that the launch provider may use to support the actual "Go/No Go" decision on a launch. In this manner, the launch hold may only be a true recommendation and the ultimate "Go/No Go" decision may rest with the launch provider.

In various embodiments, the method may be periodically repeated, such as once every minute to dynamically determine whether a launch criteria is or is not met in real-time and/or near real-time.

Various embodiments may include a Launch Pad touch screen computing device, such as a tablet or table-top touch screen computing device. Such Launch Pad touch screen computing device may display a user selectable video interface. Various embodiments may provide expert launch weather information. Various embodiments may provide airspace and marine deconfliction common operating pictures. Various embodiments may provide intelligent airspace safety for space traffic management. Various embodiments may reduce risk with better space situational awareness. Various embodiments may provide on-the-second launch collision avoidance. Various embodiments may provide frequency monitoring and telemetry. Various embodiments may provide integrated communications. Various embodiments may provide customizable optics.

Figure 27:
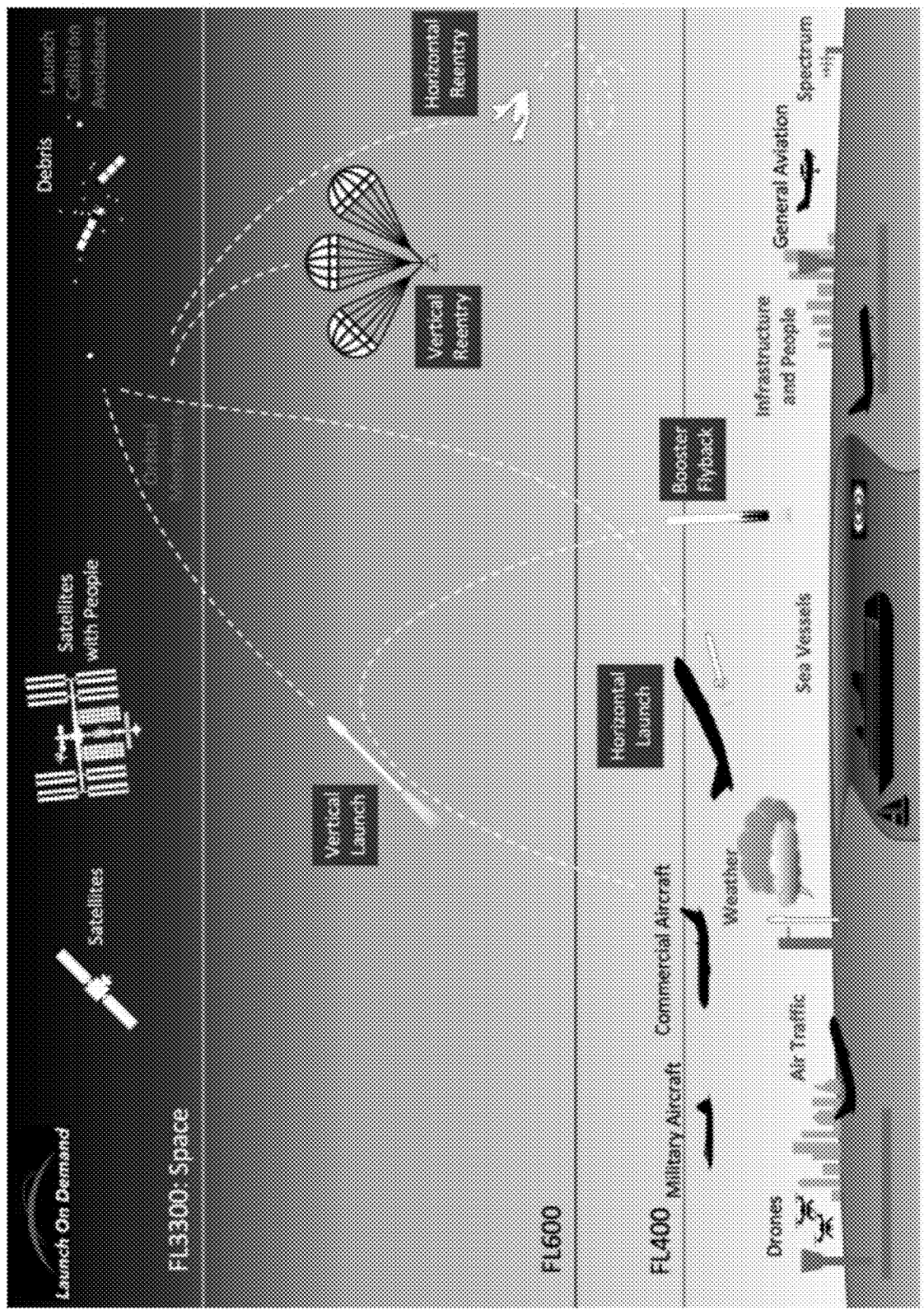
FIG. 27 illustrates a launch and reentry environment.
Figure 28:
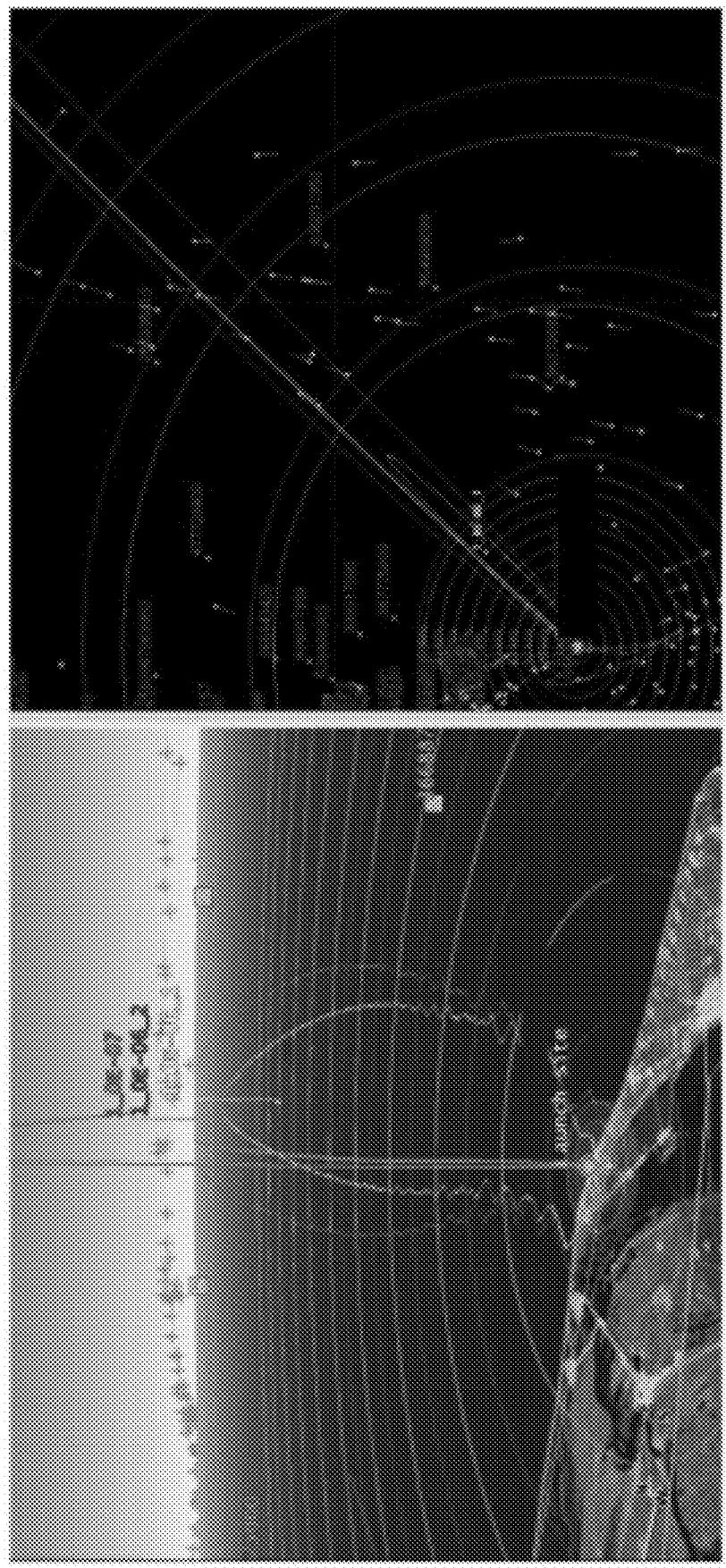
FIG. 28 illustrates a common operating picture.

Various embodiments may support a new space economy. A transformation in access to space is unleashing a $3T space economy. "New space" players increasingly provide and use technologies that will make space access a commodity service. Although news media often reports exciting rocket launches it frequently does not cover the technical and regulatory complexities of safely launching from terrestrial locations through busy airspace and into increasingly congested orbits. FIG. 27 illustrates some of those complexities. Various embodiments may provide mission assurance for these companies that lets them meet their regulatory commitments and safety obligations. By providing a full spectrum of space launch services, various embodiments may enable vehicle operators, payload and satellite owners, and spaceports to remain focused on their core businesses. Various embodiments may provide an integrated air and sea common operating picture, for example as illustrated in FIG. 28, on-the-second launch collision avoidance analysis, safety modeling and dynamic routing around launch debris, advanced weather forecasting and observations, airspace coordination, telemetry acquisition, launch optics, and/or frequency monitoring and spectrum protection.

Various embodiments may enable, safe, efficient, and effective launches. Launch providers and commercial spaceport operators licensed in the United States must comply with Federal Aviation Administration (FAA) licensing requirements. These requirements are applicable even if a U.S. company is launching from a foreign location. The regulations in 14 CFR Subchapter C Parts 417, 420, 431, 433, and 435 require license holders to engage in specialized activities that are often outside their areas of business interest. Moreover, cost efficiencies are more difficult to realize when considering the demand frequency of a single launch provider or location. Various embodiments may provide an efficient and effective alternative. Various embodiments may enable all clients, regardless of size, to leverage expert services via a modern, federated architecture. Various embodiments may eliminate the need to develop expertise in non-core business areas and minimizes investment in site-unique infrastructure and personnel by offering these as on-demand services. Various embodiments may produce savings of nearly 80% compared to legacy launch systems. Various embodiments may enable services to be standardized for ease of use. Various embodiments may provide access to datasets and decision tools that may let companies shape their launch activities using business considerations rather than solely the constraints of sub-optimized and bureaucratically-selected government launch windows. This "launch on condition" approach enabled by the various embodiments may redefine what it means to support vehicle and payload customers.

Figure 29:
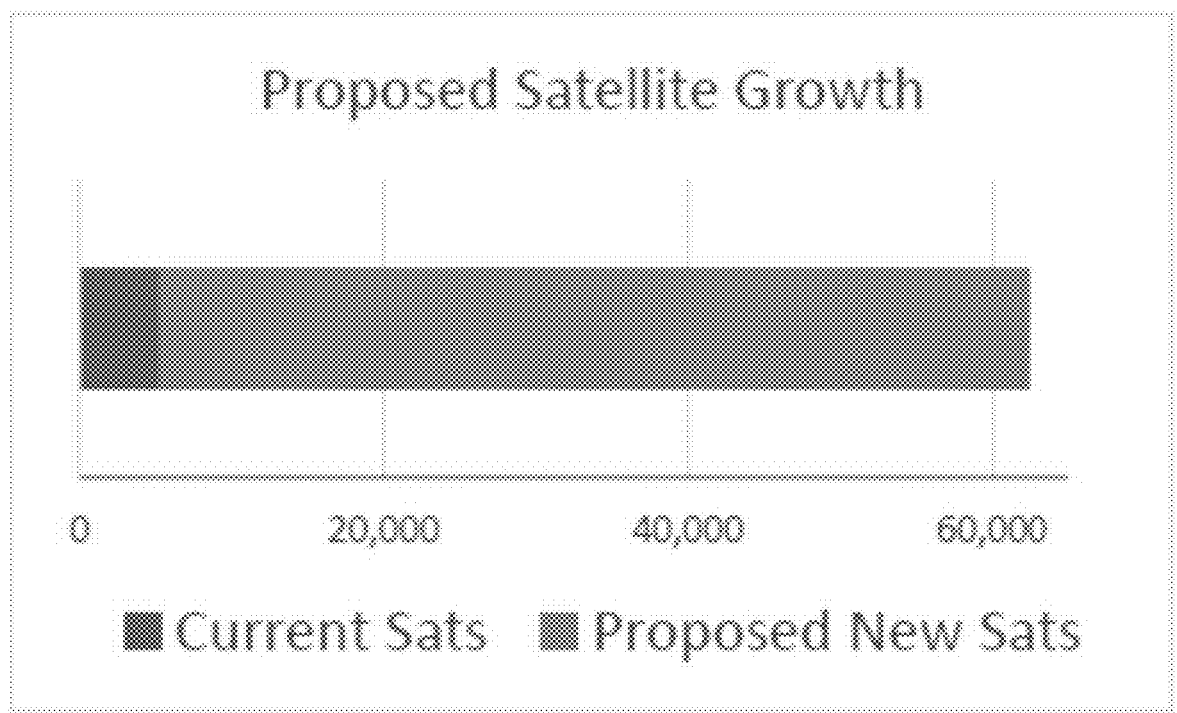
FIG. 29 is a graph of proposed satellite growth.
Figure 30:
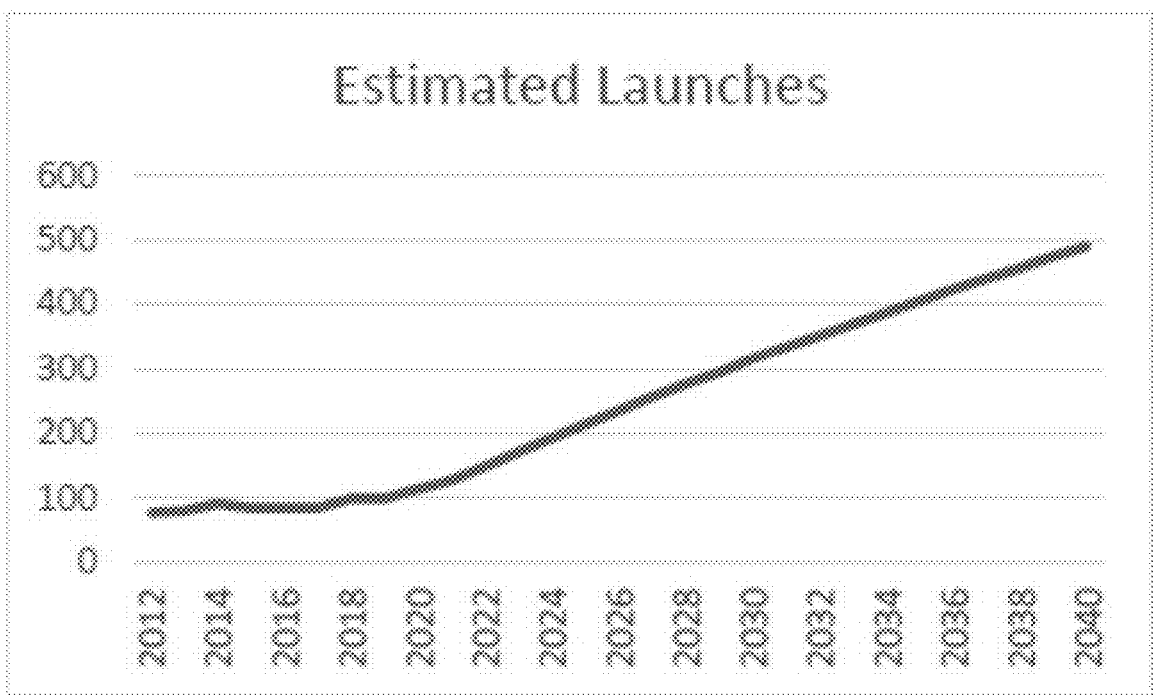
FIG. 30 is a graph of estimated global launches over time.

Demand for launch services is expected to increase as the number of U.S. and worldwide launches increases. The U.S. has recently launched 20 to 45 times per year, including military, civil, and commercial space, but that number is almost certain to increase. The number of worldwide launches is predicted to increase dramatically over the next decade as reflected in FIG. 30. Commercial providers have lowered the cost of access through competition and innovation such as re-usable vehicles. Other technologies such as additive manufacturing and single-stage-to-orbit rockets promise to further drive down costs. This progress will unleash additional launch demand, creating new entrants and a positive feedback loop for the space economy. Various embodiments may provide transformative services, including new architecture and reduced pricing, better position launch companies to capture increased worldwide demand. In addition to newcomers that will require launch services, several established players are enhancing their portfolios by fielding "mega-costellations" of satellites. SpaceX planned for 12,000 Starlink satellites but has submitted regulatory paperwork to accommodate an additional 30,000. The Falcon 9 vehicle has demonstrated the capacity to deploy about 60 of these per launch and as of Apr. 22, 2020, the company has launched 422 Starlink satellites. Others, including Boeing and Amazon, also have plans for large constellations that will drive launch demand. Worldwide, there are over 55,000 proposed satellites as illustrated in FIG. 29, which does not include OneWeb's just-proposed 48,000-satellite constellation. Clearly, proceeding with these manifests requires an enormous number of launches.

Figure 31:
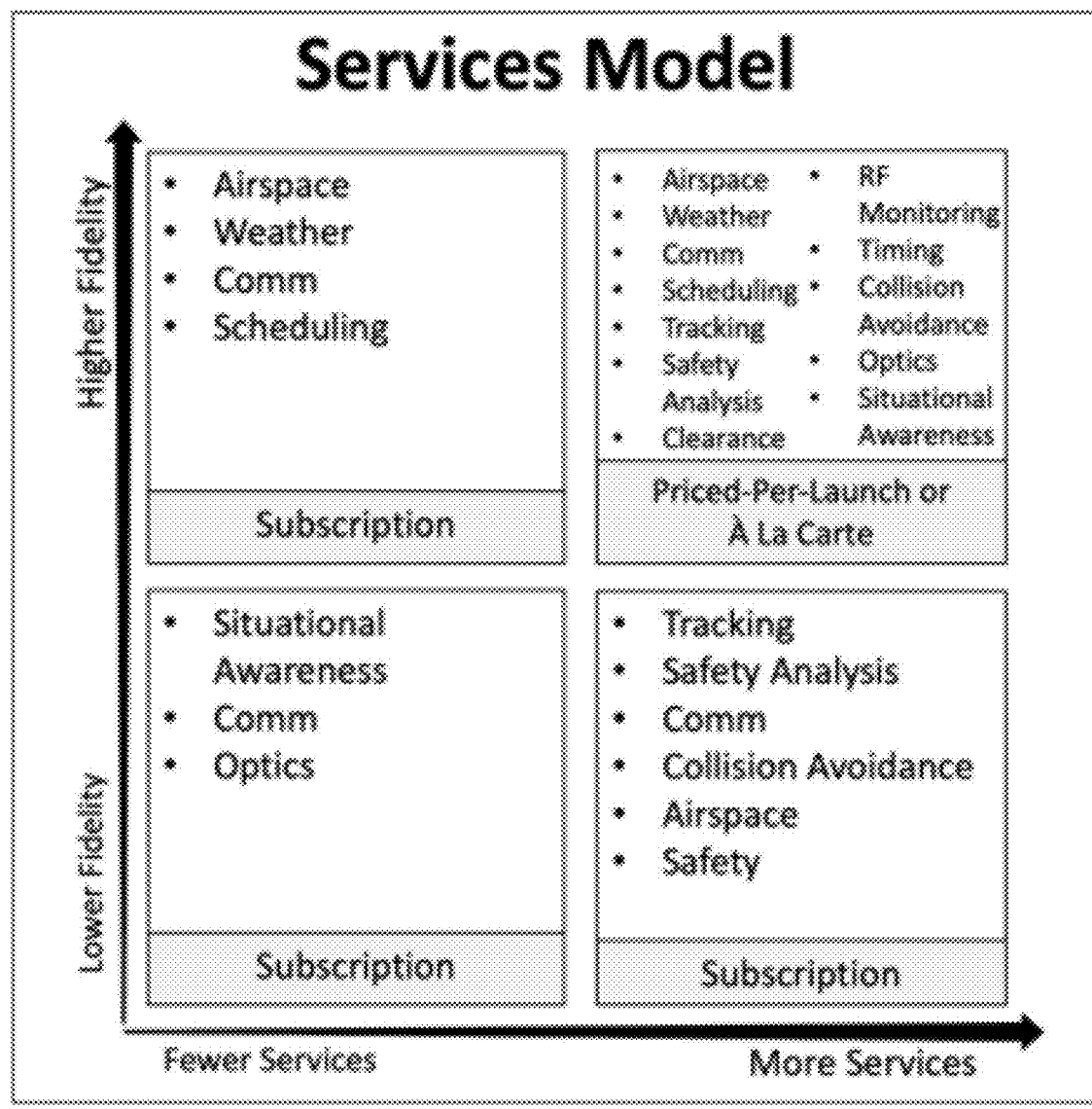
FIG. 31 is a diagram of service models.

Various embodiments may provide a model that simplifies the customer's investment in mission assurance and launch licensing compliance. A typical spaceport or launch provider can expect "one-time" purchases of infrastructure, on-going "always-on" costs, and "per-launch" expenses. Various embodiments may also provide opportunities to monetize a space port's capability by selling access to tiered levels of information fidelity to regulatory institutions, insurance groups, education and entertainment, etc., as illustrated in FIG. 31.

Various embodiments may include air and sea situational awareness using advanced common operating picture tools, safety analysis, and evaluation of weather observations and predictions for conformance to launch commit criteria.

Figure 32:
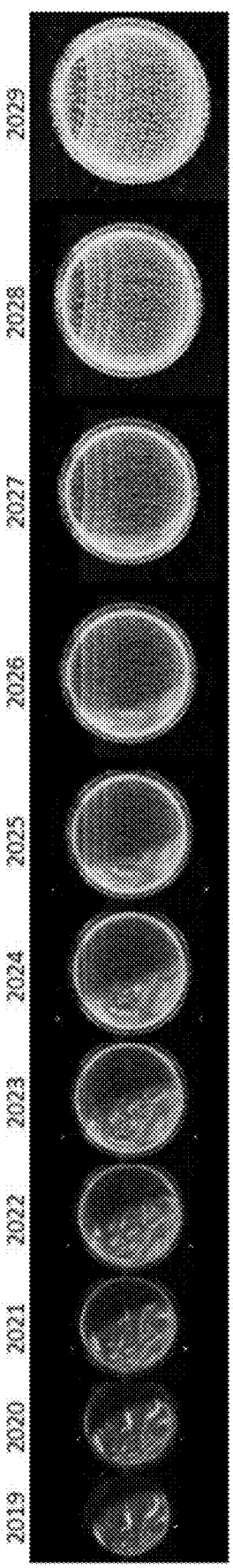
FIG. 32 is a graphical representation of increasing satellite congestion due to mega-constellations over time.

Various embodiments may determine launch opportunities and allow for on-orbit collision avoidance. As congestion from mega-constellations increases as shown in FIG. 32, access to the once-per-second collision avoidance analysis provided by various embodiments may will be critical. Identifying and leveraging non-continuous launch opportunities will be the difference between launching and not launching. Various embodiments may make use of space-based telemetry to cut costs, reduce infrastructure investment, and provide launch location flexibility. Various embodiments may provide an architecture that allows the network to define a safe, effective, and efficient range.

Figure 33:
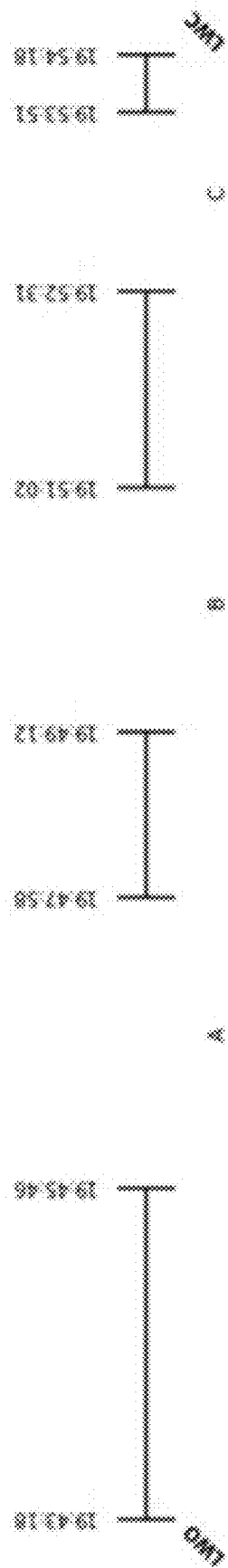
FIG. 33 illustrates an example of non-linear launch opportunities from a launch point on earth for a launch vehicle according to various embodiments.

Various embodiments may provide on-the-second launch collision avoidance. FIG. 33 illustrates an example of non-linear launch opportunities from a launch point on earth for a launch vehicle according to various embodiments. As illustrated in FIG. 33, the non-linear launch opportunity defines a series of non-periodic and discontinuous clear launch windows (e.g., 19:43:18 to 19:45:46, 19:47:58 to 19:49:12, 19:51:02 to 19:52:31, and 19:53:51 to 19:54:18) within a time span from a starting time (labeled LWO (i.e., launch window open) in FIG. 33) until a computed set of orbital mechanics for the launch vehicle are no longer valid (labeled LWC (i.e., launch window close) in FIG. 33). FIG. 33 illustrates the launch hold times in between the starting time (LWO) and ending time (LWC) and the objects causing the respective holds and the respective distances to the launch path of the objects during the holds. In various embodiments, each of the series of non-periodic and discontinuous clear launch windows indicate times during which condition-based launch criteria are estimated to be met for the launch point and the launch vehicle. In various embodiments, each of the series of non-periodic and discontinuous clear launch windows have a length, such as 10 minutes, 20 minutes, 60 minutes, and each of the lengths may be different.

Figure 24:
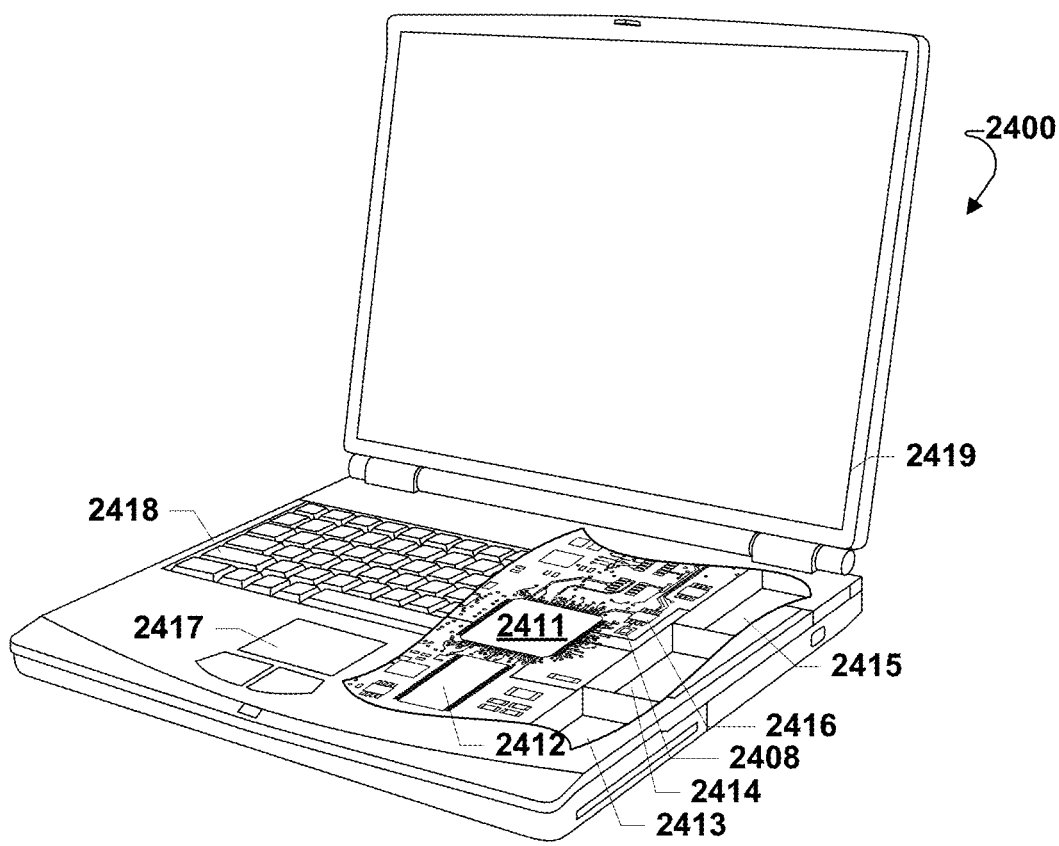
FIG. 24 is a component block diagram of a laptop that is a computing device suitable for use in the various embodiments.

The various embodiments described above (including, but not limited to, embodiments discussed above with reference to FIGS. 1-23 and 27-33) may be implemented within a variety of computing devices, such as a laptop computer 2400 illustrated in FIG. 24. Many laptop computers include a touchpad touch surface 2417 that serves as the computer's pointing device, and thus may receive drag, scroll, and flick gestures similar to those implemented on mobile computing devices equipped with a touch screen display and described above. A laptop computer 2400 will typically include a processor 2411 coupled to volatile memory 2412 and a large capacity nonvolatile memory, such as a disk drive 2413 of Flash memory. Additionally, the computer 2400 may have one or more antennas 2408 for sending and receiving electromagnetic radiation that may be connected to a wireless data link and/or cellular telephone transceiver 2416 coupled to the processor 2411. The computer 2400 may also include a floppy disc drive 2414 and a compact disc (CD) drive 2415 coupled to the processor 2411. In a notebook configuration, the computer housing includes the touchpad 2417, the keyboard 2418, and the display 2419 all coupled to the processor 2411. Other configurations of the mobile computing device may include a computer mouse or trackball coupled to the processor (e.g., via a USB input) as are well known, which may also be used in conjunction with the various embodiments.

Figure 25:
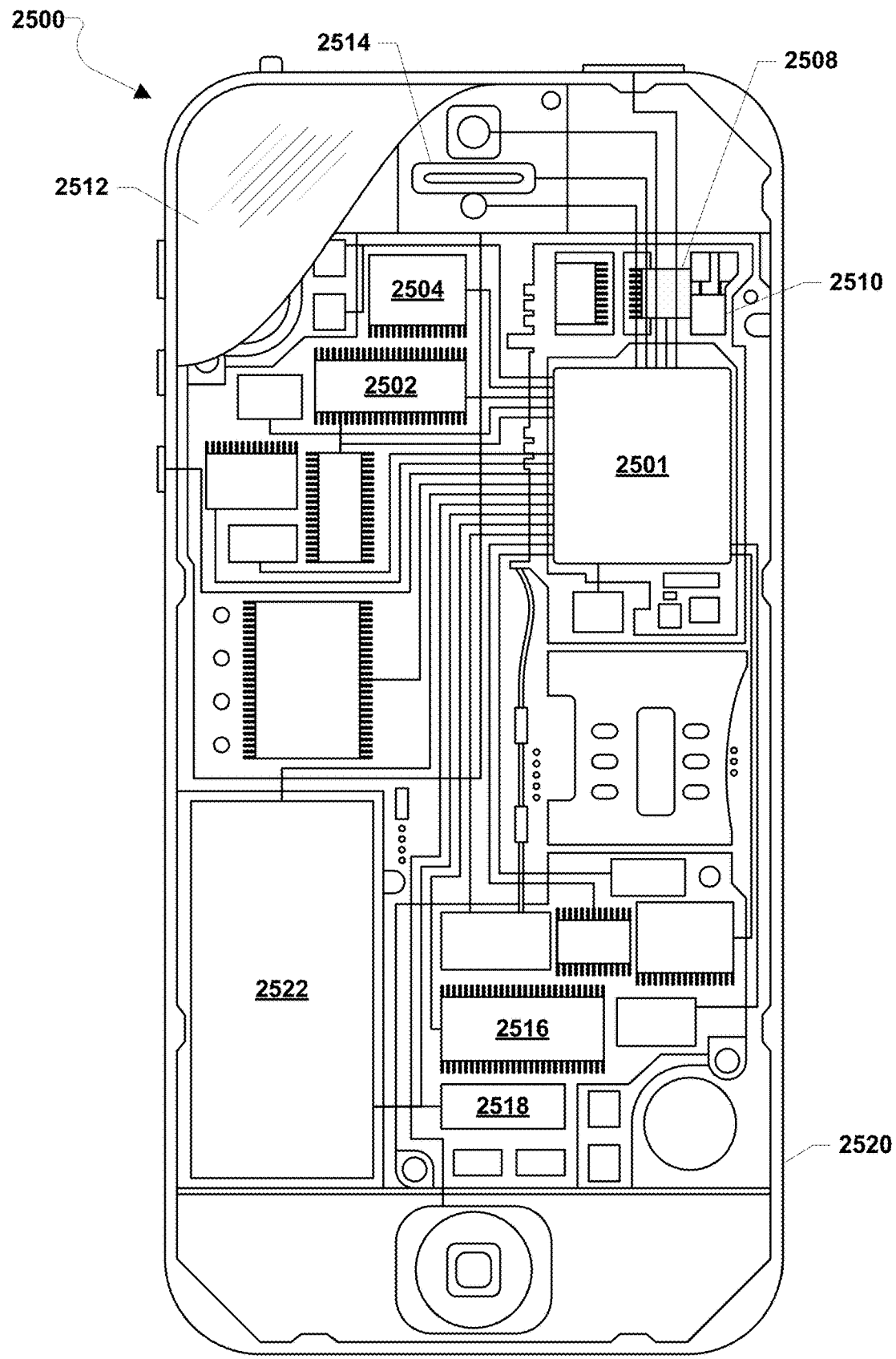
FIG. 25 is a component block diagram of a mobile computing device suitable for use in the various embodiments.

The various embodiments (including, but not limited to, embodiments discussed above with reference to FIGS. 1-23 and 27-33) may be implemented in any of a variety of the computing devices (e.g., mobile devices), an example of which is illustrated in FIG. 25. For example, the mobile device 2500 may include a processor 2501 coupled to a touch screen controller 2504 and an internal memory 2502. The processor 2501 may be one or more multicore integrated circuits (ICs) designated for general or specific processing tasks. The internal memory 2502 may be volatile or non-volatile memory, and may also be secure and/or encrypted memory, or unsecure and/or unencrypted memory, or any combination thereof. The touch screen controller 2504 and the processor 2501 may also be coupled to a touch screen panel 2512, such as a resistive-sensing touch screen, capacitive-sensing touch screen, infrared sensing touch screen, etc. The mobile device 2500 may have one or more radio signal transceivers 2508 (e.g., Peanut®, Bluetooth®, Zigbee®, Wi-Fi, RF, cellular (e.g., CDMA, TDMA, GSM, PCS, 3G, 4G, LTE, etc.), etc.) and antennae 2510, for sending and receiving, coupled to each other and/or to the processor 2501. The transceivers 2508 and antennae 2510 may be used with the above-mentioned circuitry to implement the various wireless transmission protocol stacks and interfaces. The mobile device 2500 may include a cellular network wireless modem chip 2516 that enables communication via a cellular network and is coupled to the processor. The mobile device 2500 may include a peripheral device connection interface 2518 coupled to the processor 2501. The peripheral device connection interface 2518 may be singularly configured to accept one type of connection, or multiply configured to accept various types of physical and communication connections, common or proprietary, such as USB, FireWire, Thunderbolt, or PCIe. The peripheral device connection interface 2518 may also be coupled to a similarly configured peripheral device connection port (not shown). The mobile device 2500 may also include speakers 2514 for providing audio outputs. The mobile device 2500 may also include a housing 2520, constructed of a plastic, metal, or a combination of materials, for containing all or some of the components discussed herein. The mobile device 2500 may include a power source 2522 coupled to the processor 2501, such as a disposable or rechargeable battery. The rechargeable battery may also be coupled to the peripheral device connection port to receive a charging current from a source external to the mobile device 2500.

Figure 26:
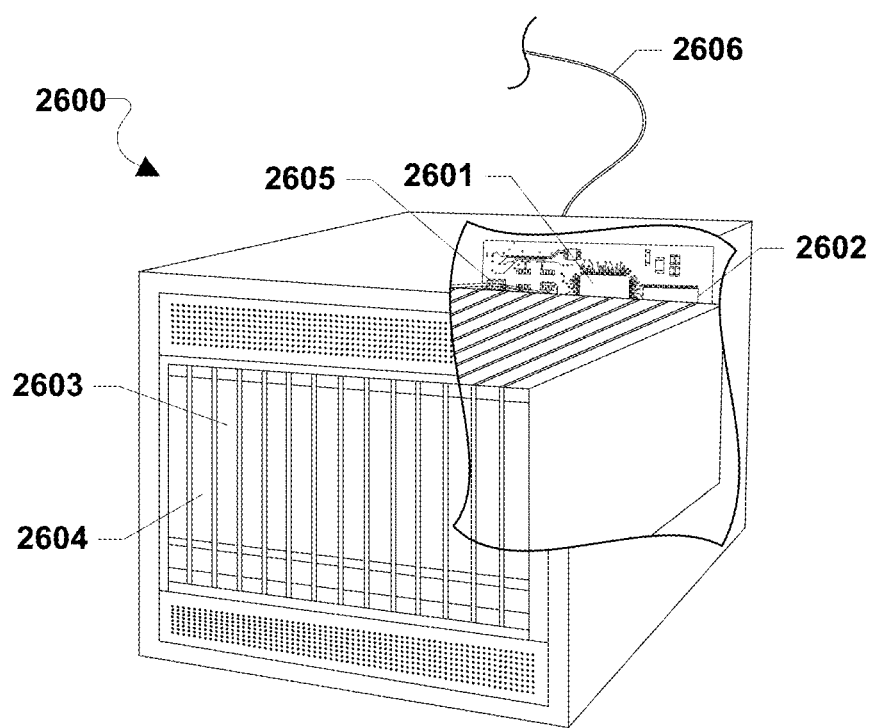
FIG. 26 is a component block diagram of a server that is a computing device suitable for use in the various embodiments.

The various embodiment (including, but not limited to, embodiments discussed above with reference to FIGS. 1-23 and 27-33) may also be performed partially or completely on a variety of computing devices, such as a server. Such embodiments may be implemented on any of a variety of commercially available server devices, such as the server 2600 illustrated in FIG. 26. Such a server 2600 typically includes a processor 2601 coupled to volatile memory 2602 and a large capacity nonvolatile memory, such as a disk drive 2603. The server 2600 may also include a floppy disc drive, compact disc (CD) or DVD disc drive 2604 coupled to the processor 2601. The server 2600 may also include network access ports 2605 coupled to the processor 2601 for establishing data connections with a network 2606, such as a local area network coupled to other broadcast system computers and servers. The processor 2601 may be any programmable microprocessor, microcomputer or multiple processor chip or chips that may be configured by software instructions (applications) to perform a variety of functions, including the functions of the various embodiments described above. Typically, software applications may be stored in the internal memory 2602, 2603 before they are accessed and loaded into the processor 2601. The processor 2601 may include internal memory sufficient to store the application software instructions.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), a graphics processing unit (GPU), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A space launch service platform computing device, comprising:
at least one processor configured with processor-executable instructions to:
receive a plurality of data feeds that include:
a data feed from a satellite catalog;
a data feed from an orbital debris catalog;
a data feed from a national airspace tracking system;
a data feed from a maritime tracking system;
a data feed from a weather monitoring system; and
a data feed from a range monitoring system;
receive monitoring data from a plurality of sensors located at a launch site and on a launch vehicle;
use the received plurality of data feeds and the received monitoring data to generate combined launch data indicative of current and predicted conditions at and around the launch site and along a proposed launch trajectory of the launch vehicle;
analyze the combined launch data based on condition-based launch criteria to identify two or more non-linear non-periodic and discontinuous clear launch windows within a defined time span, wherein each launch window represents a time period during which the condition-based launch criteria are estimated to be met for the launch vehicle, at and around the launch site, and along the proposed launch trajectory; and
output an indication of the identified non-linear non-periodic and discontinuous clear launch windows as launch opportunities tailored to the launch vehicle and mission parameters.

2. The space launch service platform computing device of claim 1, wherein the at least one processor is configured with processor-executable instructions to receive the monitoring data from the plurality of sensors located at the launch site and on the launch vehicle by:
receiving monitoring data that includes real-time structural integrity assessments that allow for on-the-fly adjustments to a launch schedule based on the condition of the launch vehicle.

3. The space launch service platform computing device of claim 1, wherein the at least one processor is configured with processor-executable instructions to receive monitoring data from the plurality of sensors located at the launch site and on the launch vehicle by receiving:
frequency data;
global positioning system (GPS) data;
telemetry data;
optics data; and
surveillance data.

4. The space launch service platform computing device of claim 1, wherein the at least one processor is configured with processor-executable instructions to use the received plurality of data feeds and the received monitoring data to generate the combined launch data indicative of the current and the predicted conditions at and around the launch site and along the proposed launch trajectory of the launch vehicle by using the received plurality of data feeds and the received monitoring data to generate combined launch data indicative of current and predicted environmental, spatial, and technical conditions at and around the launch site and along a proposed launch trajectory of the launch vehicle.

5. The space launch service platform computing device of claim 1, wherein the at least one processor is configured with processor-executable instructions to analyze the combined launch data against the set of condition-based launch criteria by analyzing the combined launch data against safety criteria, compliance with regulatory standards, and alignment with mission objectives, wherein:
the safety criteria include assessments of risk to human life and property both on the ground and in the path of the launch vehicle; and
compliance with the regulatory standards includes compliance with international treaties and agreements related to space launches.

6. The space launch service platform computing device of claim 1, wherein the at least one processor is configured with processor-executable instructions to analyze the combined launch data based on the condition-based launch criteria to identify two or more non-linear non-periodic and discontinuous clear launch windows within the defined time span, each launch window representing the time period during which the condition-based launch criteria are estimated to be met for the launch vehicle, at and around the launch site, and along the proposed launch trajectory by:

analyzing the launch windows using a non-linear process that accounts for interactions among a plurality of variables that include at least one or more of:
an environmental condition variable;
a launch vehicle readiness variable; and
a launch trajectory variable.

7. The space launch service platform computing device of claim 1, wherein the at least one processor is further configured with processor-executable instructions to determine the non-linear non-periodic and discontinuous clear launch windows based on a multifaceted and non-directly proportional relationship to the plurality of variables.

8. The space launch service platform computing device of claim 1, wherein the at least one processor is configured with processor-executable instructions to analyze the combined launch data based on the condition-based launch criteria to identify two or more non-linear non-periodic and discontinuous clear launch windows within the defined time span, each launch window representing the time period during which the condition-based launch criteria are estimated to be met for the launch vehicle, at and around the launch site, and along the proposed launch trajectory by:
determining non-periodic launch windows characterized by their occurrence at irregular intervals that are not predictable based on a fixed schedule or historical patterns.

9. The space launch service platform computing device of claim 1, wherein the at least one processor is configured with processor-executable instructions to analyze the combined launch data based on the condition-based launch criteria to identify two or more non-linear non-periodic and discontinuous clear launch windows within the defined time span, each launch window representing the time period during which the condition-based launch criteria are estimated to be met for the launch vehicle, at and around the launch site, and along the proposed launch trajectory by:
determining discontinuous launch windows that include separate and sporadic opportunities for launch that do not form a continuous sequence and are identified based on fluctuating and episodic alignment of the condition-based launch criteria.

10. The space launch service platform computing device of claim 1, wherein the at least one processor is configured with processor-executable instructions to output the indication of the identified non-linear non-periodic and discontinuous clear launch windows as launch opportunities tailored to the launch vehicle and mission parameters by:
outputting aviation risk criteria, maritime risk criteria, weather information, real-time on-orbit collision avoidance information, frequency monitoring information, electro-optical video information, vehicle tracking information, telemetry processing information, and voice network information.

11. The space launch service platform computing device of claim 1, wherein the at least one processor is configured with processor-executable instructions to output the indication of the identified non-linear non-periodic and discontinuous clear launch windows as launch opportunities tailored to the launch vehicle and mission parameters by:
outputting visual representations on a graphical user interface that displays the launch windows in a timeline format with overlaid condition-based criteria assessments.

12. The space launch service platform computing device of claim 1, wherein the at least one processor is configured with processor-executable instructions to output the indication of the identified non-linear non-periodic and discontinuous clear launch windows as launch opportunities tailored to the launch vehicle and mission parameters by:
outputting potential launch scenarios based on the combined launch data so as to allow operators to visualize and assess different launch trajectories and conditions before making a final launch decision.

13. The space launch service platform computing device of claim 1, wherein the at least one processor is configured with processor-executable instructions to output the indication of the identified non-linear non-periodic and discontinuous clear launch windows as launch opportunities tailored to the launch vehicle and mission parameters by:
outputting a probabilistic assessment for each of the identified non-linear non-periodic and discontinuous clear launch windows indicating a likelihood of the window remaining viable up to the point of launch.

14. The space launch service platform computing device of claim 1, wherein the at least one processor is further configured with processor-executable instructions to determine a duration of each of the identified clear launch windows.

15. The space launch service platform computing device of claim 14, wherein the at least one processor is configured with processor-executable instructions to:
determine the duration of each identified clear launch window by determining varying durations that include 10, 20, and 60 minute intervals based on dynamically determined conditions at and around the launch site and along the proposed launch trajectory; and
implement adaptive scheduling by dynamically adjusting the varying durations of each identified clear launch window in response to real-time changes in the environmental, spatial, and technical conditions.

16. The space launch service platform computing device of claim 1, wherein the at least one processor is further configured with processor-executable instructions to integrate historical weather data with real-time weather monitoring system feeds to predict future environmental conditions at the launch site and along the proposed launch trajectory.

17. The space launch service platform computing device of claim 1, wherein the at least one processor is further configured with processor-executable instructions to use the combined launch data to forecast potential changes in launch window availability based on evolving environmental, technical, and spatial conditions.

18. The space launch service platform computing device of claim 1, wherein the at least one processor is further configured with processor-executable instructions to evaluate the identified non-linear non-periodic and discontinuous clear launch windows with respect to orbits of other space vehicles and space stations to determine the potential impact of each non-linear non-periodic and discontinuous clear launch window on international space traffic.

19. The space launch service platform computing device of claim 1, wherein the at least one processor is further configured with processor-executable instructions to activate an automated alert system within the computing device that notifies relevant personnel and authorities when the identified launch windows are imminent and when significant changes in launch conditions occur.

20. A method for determining launch opportunities for a space vehicle from a terrestrial launch point, the method comprising:
receiving, by a computing device, a plurality of data feeds including:

a data feed from a satellite catalog;
a data feed from an orbital debris catalog;
a data feed from a national airspace tracking system;
a data feed from a maritime tracking system;
a data feed from a weather monitoring system; and
a data feed from a range monitoring system;
receiving, by the computing device, monitoring data from a plurality of sensors located at a launch site and on a launch vehicle;
using, by the computing device, the received plurality of data feeds and the received monitoring data to generate combined launch data indicative of current and predicted conditions at and around the launch site and along a proposed launch trajectory of the launch vehicle;
analyzing, by the computing device, the combined launch data based on condition-based launch criteria to identify two or more non-linear non-periodic and discontinuous clear launch windows within a defined time span, wherein each launch window represents a time period during which the condition-based launch criteria are estimated to be met for the launch vehicle, at and around the launch site, and along the proposed launch trajectory; and
outputting, by the computing device, an indication of the identified non-linear non-periodic and discontinuous clear launch windows as launch opportunities tailored to the launch vehicle and mission parameters.

* * * * *